(12) United States Patent
Bleyer et al.

(10) Patent No.: US 12,320,980 B2
(45) Date of Patent: Jun. 3, 2025

(54) LOW MOTION TO PHOTON LATENCY RAPID TARGET ACQUISITION

(71) Applicant: Microsoft Technology Licensing, LLC, Redmond, WA (US)

(72) Inventors: Michael Bleyer, Seattle, WA (US); Sudipta Narayan Sinha, Kirkland, WA (US); Christopher Douglas Edmonds, Carnation, WA (US); Raymond Kirk Price, Carnation, WA (US)

( * ) Notice: Subject to any disclaimer, the term of this patent is extended or adjusted under 35 U.S.C. 154(b) by 0 days.

(21) Appl. No.: 18/384,572

(22) Filed: Oct. 27, 2023

(65) Prior Publication Data
US 2024/0061251 A1 Feb. 22, 2024

Related U.S. Application Data

(63) Continuation of application No. 17/986,445, filed on Nov. 14, 2022, now Pat. No. 11,841,509, which is a
(Continued)

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/012* (2013.01); *G06F 3/017* (2013.01);
(Continued)

(58) Field of Classification Search
CPC ........ G02B 27/0172; G02B 2027/0138; G06T 7/337; G06T 7/248; G06T 19/006; G06F 3/012; G06F 3/017
See application file for complete search history.

(56) References Cited

U.S. PATENT DOCUMENTS 7,787,012 B2 * 8/2010 Scales ..................... F41G 3/16
348/158
8,587,659 B1 * 11/2013 Socolinsky ............ H04N 23/23
318/47

(Continued)

OTHER PUBLICATIONS

U.S. Appl. No. 17/108,673, filed Dec. 1, 2020.
(Continued)

*Primary Examiner* — Doon Y Chow
(74) *Attorney, Agent, or Firm* — Workman Nydegger

(57) ABSTRACT

Techniques for updating a position of overlaid image content using IMU data to reflect subsequent changes in camera positions to minimize latency effects are disclosed. A "system camera" refers to an integrated camera that is a part of an HMD. An "external camera" is a camera that is separated from the HMD. The system camera and the external camera generate images. These images are overlaid on one another and aligned to form an overlaid image. Content from the external camera image is surrounded by a bounding element in the overlaid image. IMU data associated with both the system camera and the external camera is obtained. Based on that IMU data, an amount of movement that the system camera and/or the external camera have moved since the images were originally generated is determined. Based on that movement, the bounding element is shifted to a new position in the overlaid image.

19 Claims, 24 Drawing Sheets

Related U.S. Application Data continuation of application No. 17/108,673, filed on Dec. 1, 2020, now Pat. No. 11,543,665.

(51) Int. Cl.
*G06T 7/246* (2017.01)
*G06T 7/33* (2017.01)
*G06T 19/00* (2011.01)

(52) U.S. Cl.
CPC .............. *G06T 7/248* (2017.01); *G06T 7/337* (2017.01); *G06T 19/006* (2013.01); *G02B 2027/0138* (2013.01)

(56) References Cited

U.S. PATENT DOCUMENTS

| | | | |
|---|---|---|---|
| 11,049,277 B1* | 6/2021 | Price | H04N 13/128 |
| 11,543,665 B2* | 1/2023 | Bleyer | H04N 23/90 |
| 11,900,621 B2* | 2/2024 | Price | G06T 7/11 |
| 2018/0047332 A1* | 2/2018 | Kuwahara | G06F 3/012 |
| 2018/0270441 A1* | 9/2018 | Van Geel | G06T 7/97 |

OTHER PUBLICATIONS

U.S. Appl. No. 17/986,445, filed Nov. 14, 2022.
Notice of Allowance Issued in U.S. Appl. No. 17/108,673.
Communication under Rule 71(3) Received for European Application No. 21811622.6, mailed on Feb. 20, 2025, 08 pages.

\* cited by examiner

LOW MOTION TO PHOTON LATENCY RAPID TARGET ACQUISITION

CROSS-REFERENCE TO RELATED APPLICATIONS

This application is a continuation of U.S. patent application Ser. No. 17/986,445 filed on Nov. 14, 2022, entitled "LOW MOTION TO PHOTON LATENCY RAPID TARGET ACQUISITION," which is a continuation of U.S. patent application Ser. No. 17/108,673 filed on Dec. 1, 2020, entitled "LOW MOTION TO PHOTON LATENCY RAPID TARGET ACQUISITION," which issued as U.S. Pat. No. 11,543,665 on Jan. 3, 2023, which applications are expressly incorporated herein by reference in their entirety.

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

Some of these challenges occur when attempting to align image content from multiple cameras, such as an integrated "system camera" and a detached "external camera" when generating the passthrough image. Challenges also occur when additional visualizations are provided in the resulting overlaid passthrough image, where these visualizations are designed to indicate a spatial relationship between the system camera and the external camera. The time taken to i) generate a system camera image and an external camera image, ii) overlay and align the content, and then iii) display the resulting overlaid passthrough image with additional visualizations is not instantaneous. Because of that, movement of the system camera and/or the external camera may occur between the time when the images are generated and when the final passthrough image is displayed. Such movement results in a visible latency or lagging effect and is disruptive to the user. Aligning image content provides substantial benefits, especially in terms of hologram placement and generation, so these problems present serious obstacles to the technical field. Accordingly, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods that update a position of overlaid image content using inertial measurement unit (IMU) data to reflect subsequent changes in camera positions in order to minimize latency effects.

In some embodiments, a system camera of a head-mounted mixed-reality system is used to generate a system camera image of an environment in which the system is operating. Additionally, the embodiments cause an external camera to generate an external camera image of the environment. The embodiments generate an overlaid image by overlaying and aligning at least some of the content included in the external camera image on top of corresponding content included in the system camera image. Notably, at least some of the external camera image's content is surrounded by a bounding element in the overlaid image. The embodiments obtain system IMU data from an IMU of the system and also obtain external IMU data from an IMU of the external camera. Based on the system IMU data and the external IMU data, the embodiments determine an amount of movement that the system camera and/or the external camera have moved relative to one another since a time when the system camera image and the external camera image were generated. Based on the determined amount of movement, the embodiments shift the bounding element to a new position in the overlaid image such that the shifted bounding element reflects an updated positional relationship between a field of view (FOV) of the system camera and a FOV of the external camera since the time when the system camera image and the external camera image were generated.

Some embodiments predict where a bounding element is to be located within an overlaid image using IMU data in order to minimize, or even eliminate, latency effects. For example, after the external IMU data is obtained from the IMU of the external camera in the manner described above, some embodiments perform the following operations (as opposed to performing the last two operations mentioned above). In particular, some embodiments generate (e.g., based on the system IMU data and the external IMU data) a prediction indicating a predicted relative position that the external camera will be relative to the system camera at a determined future point in time. Based on that prediction, the embodiments shift the bounding element to a new position in the overlaid image in order to reflect the predicted relative position of the external camera relative to the system camera. The resulting overlaid image with the updated bounding element is a type of passthrough image, which may be displayed to the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
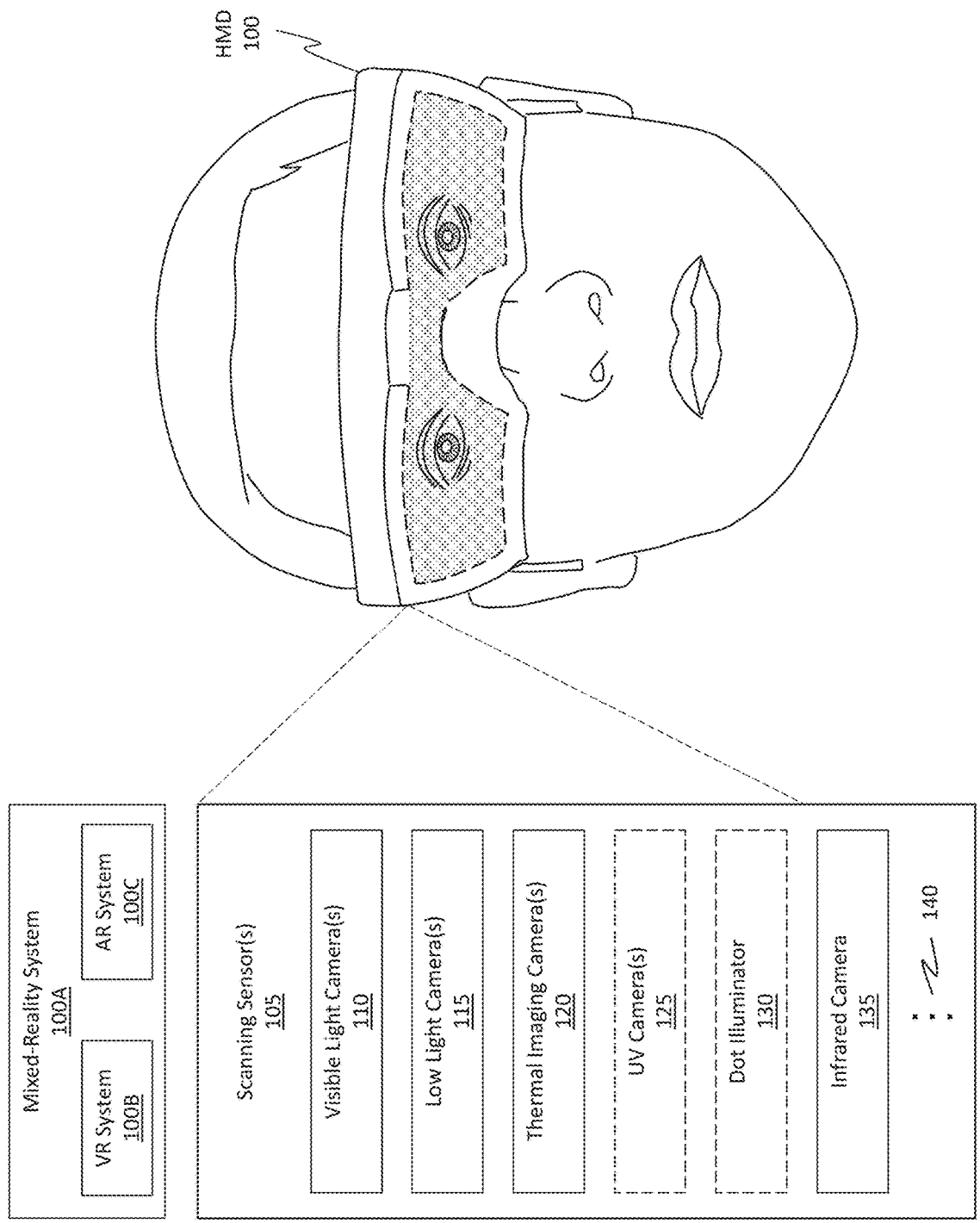
FIG. 1 illustrates an example head-mounted device (HMD) configured to perform the disclosed operations.

Embodiments disclosed herein relate to systems, devices (e.g., wearable devices, hardware storage devices, etc.), and methods that update a position of overlaid image content using inertial measurement unit (IMU) data to reflect subsequent changes in camera positions to minimize latency effects. As used herein, a "system camera" refers to an integrated camera that is a part of an HMD. An "external camera" is a camera that is detached from or that is separated from the HMD. An example of an external camera can be a camera mounted on a tool used by a user who is also wearing an HMD.

In some embodiments, a system camera and an external camera generate images. These images are overlaid on one another and aligned to form an overlaid image. Content from the external camera image is surrounded by a bounding element in the overlaid image. IMU data associated with both the system camera and the external camera is obtained. Based on that IMU data, the embodiments determine an amount of movement that the system camera and/or the external camera have moved since the images were originally generated. Based on that movement, the embodiments shift the bounding element to a new position in the overlaid image.

Some embodiments predict where the bounding element will be located at some point in the future to minimize latency effects. After the IMU data is obtained (as described above), some embodiments generate (e.g., based on the IMU data) a prediction as to where the external camera will be relative to the system camera at a determined future point in time. Based on that prediction, the embodiments shift the bounding element to a new position in the overlaid image to reflect the predicted position.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

As described earlier, challenges occur when aligning image content from two different cameras. Further challenges occur when the resulting overlaid image includes a visualization (e.g., a bounding element) whose function is to reflect the spatial relationship between the system camera and the external camera. Because the processing and rendering processes are not instantaneous, movement of the system camera and/or the external camera can result in the bounding element experiences a visual lag. The disclosed embodiments solve this lagging issue by acquiring IMU data to correct the lagging effects. In doing so, the embodiments provide substantial improvements to the user's experience with the HMD. Furthermore, the embodiments improve the visual effects provided by the HMD and also provide a more accurate and robust visualization in the form of a passthrough image. Accordingly, by practicing the disclosed principles, improved passthrough images may be generated.

Example MR Systems and HMDs

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of camera system can be used, even camera systems entirely removed or separate from an HMD. As such, the disclosed principles should be interpreted broadly to encompass any type of camera use scenario. Some embodiments may even refrain from actively using a camera themselves and may simply use the data generated by a camera. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the user's point of view. To generate this passthrough visualization, the HMD 100 may use its scanning sensor(s) 105 to scan, map, or otherwise record its surrounding environment, including any objects in the environment, and to pass that data on to the user to view. As will be described shortly, various transformations may be applied to the images prior to displaying them to the user to ensure the displayed perspective matches the user's expected perspective.

To generate a passthrough image, the scanning sensor(s) 105 typically rely on its cameras (e.g., head tracking cameras, hand tracking cameras, depth cameras, or any other type of camera) to obtain one or more raw images (aka "texture images") of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 100. Furthermore, as will be described in more detail later, the disclosed passthrough visualizations can also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, potentially (though not necessarily, as represented by the dotted box) a dot illuminator 130, and even an infrared camera 135. The ellipsis 140 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

The visible light camera(s) 110 are typically stereoscopic cameras, meaning that the fields of view of the two or more visible light cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

It should be noted that any number of cameras may be provided on the HMD 100 for each of the different camera types (aka modalities). That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
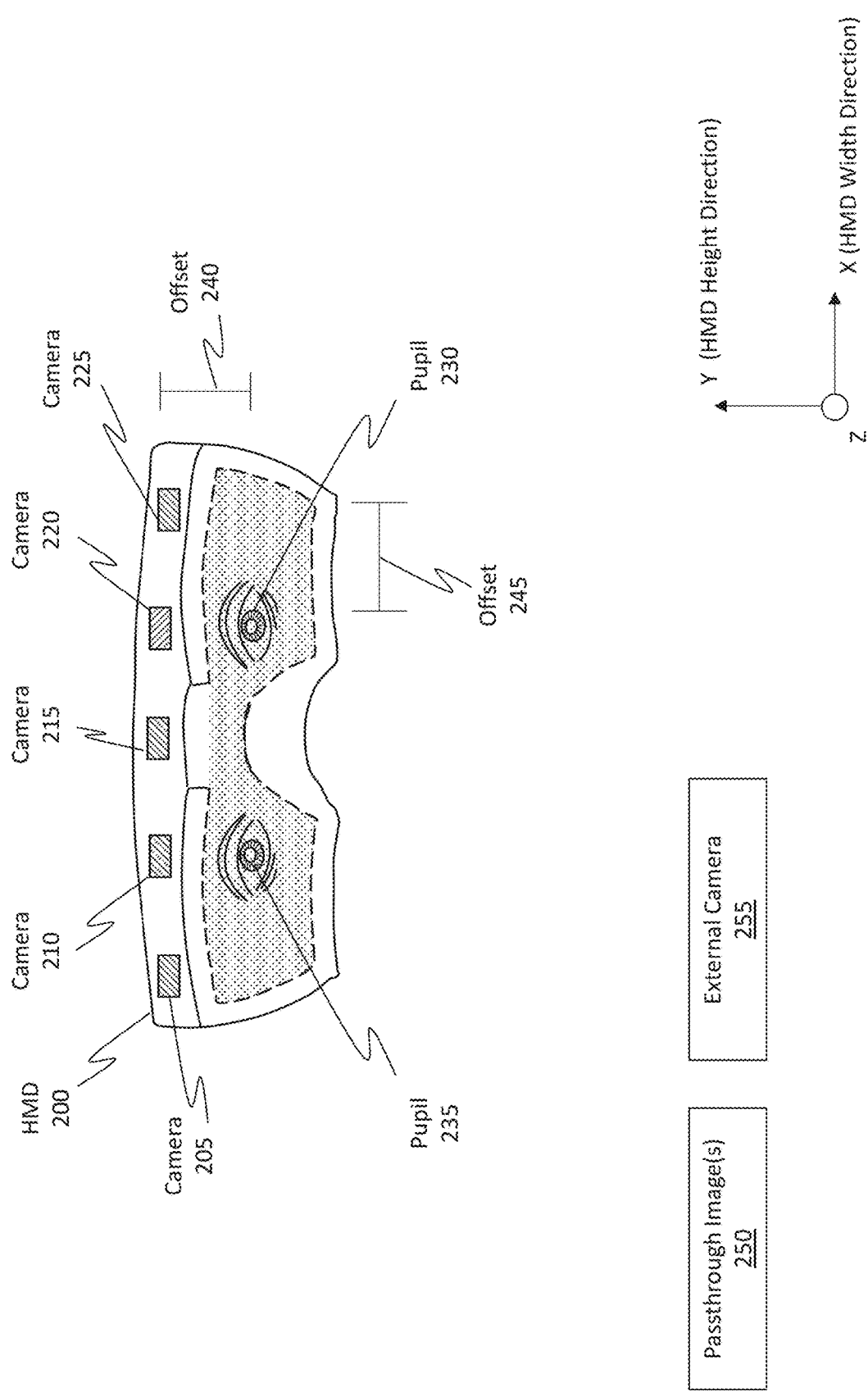
FIG. 2 illustrates another configuration of an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras.

In some cases, the cameras can be located at specific positions on the HMD 200. In some cases, a first camera (e.g., perhaps camera 220) is disposed on the HMD 200 at a position above a designated left eye position of a user who wears the HMD 200 relative to a height direction of the HMD. For example, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. With reference to FIG. 2, a camera may be physically disposed on the HMD 200 at a position in front of the pupil 230 in the z-axis direction.

When a second camera is provided (e.g., perhaps camera 210), the second camera may be disposed on the HMD 200 at a position above a designated right eye position of a user who wears the HMD relative to the height direction of the HMD. For example, the camera 210 is above the pupil 235. In some cases, the second camera is additionally positioned above the designated right eye position relative to the width direction of the HMD. When a VR system is used, a camera may be placed directly in front of the designated right eye position. With reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the view of the environment from the HMD's perspective. Cameras 205-225 are used to provide these passthrough image(s) 250. The offset (e.g., offset 240 and 245) between the cameras and the user's pupils results in parallax. In order to provide these passthrough image(s) 250, the embodiments can perform parallax correction by applying various transformations and reprojections on the images in order to change the initial perspective represented by an image into a perspective matches that of the user's pupils. Parallax correction relies on the use of a depth map in order to make the reprojections.

In some implementations, the embodiments utilize a planar reprojection process to correct parallax when generating the passthrough images as opposed to performing a full three-dimensional reprojection. Using this planar reprojection process is acceptable when objects in the environment are sufficiently far away from the HMD. Thus, in some cases, the embodiments are able to refrain from performing three-dimensional parallax correction because the objects in the environment are sufficiently far away and because that distance results in a negligible error with regard to depth visualizations or parallax issues.

Any of the cameras 205-225 constitute what is referred to as a "system camera" because they are integrated parts of the HMD 200. In contrast, the external camera 255 is physically separate and detached from the HMD 200 but can communicate wirelessly with the HMD 200. As will be described shortly, it is desirable to align images (or image content) generated by the external camera 255 with images (or image content) generated by a system camera to then generate an overlaid image, which can operate as a passthrough image. Often, the angular resolution of the external camera 255 is higher (i.e. more pixels per degree and not just more pixels) than the angular resolution of the system camera, so the resulting overlaid image provides enhanced image content beyond that which is available from using only the system camera image. Additionally, or alternatively, the modalities of the external camera 255 and the system camera may be different, so the resulting overlaid image can also include enhanced information. As an example, suppose the external camera 255 is a thermal imaging camera. The resulting overlaid image can, therefore, include visible light image content and thermal image content. Accordingly, providing an overlaid passthrough image is highly desirable. It should be noted that the external camera 255 may be any of the camera types listed earlier. Additionally, there may be any number of external cameras, without limit.

Example Scenarios

Figure 3:
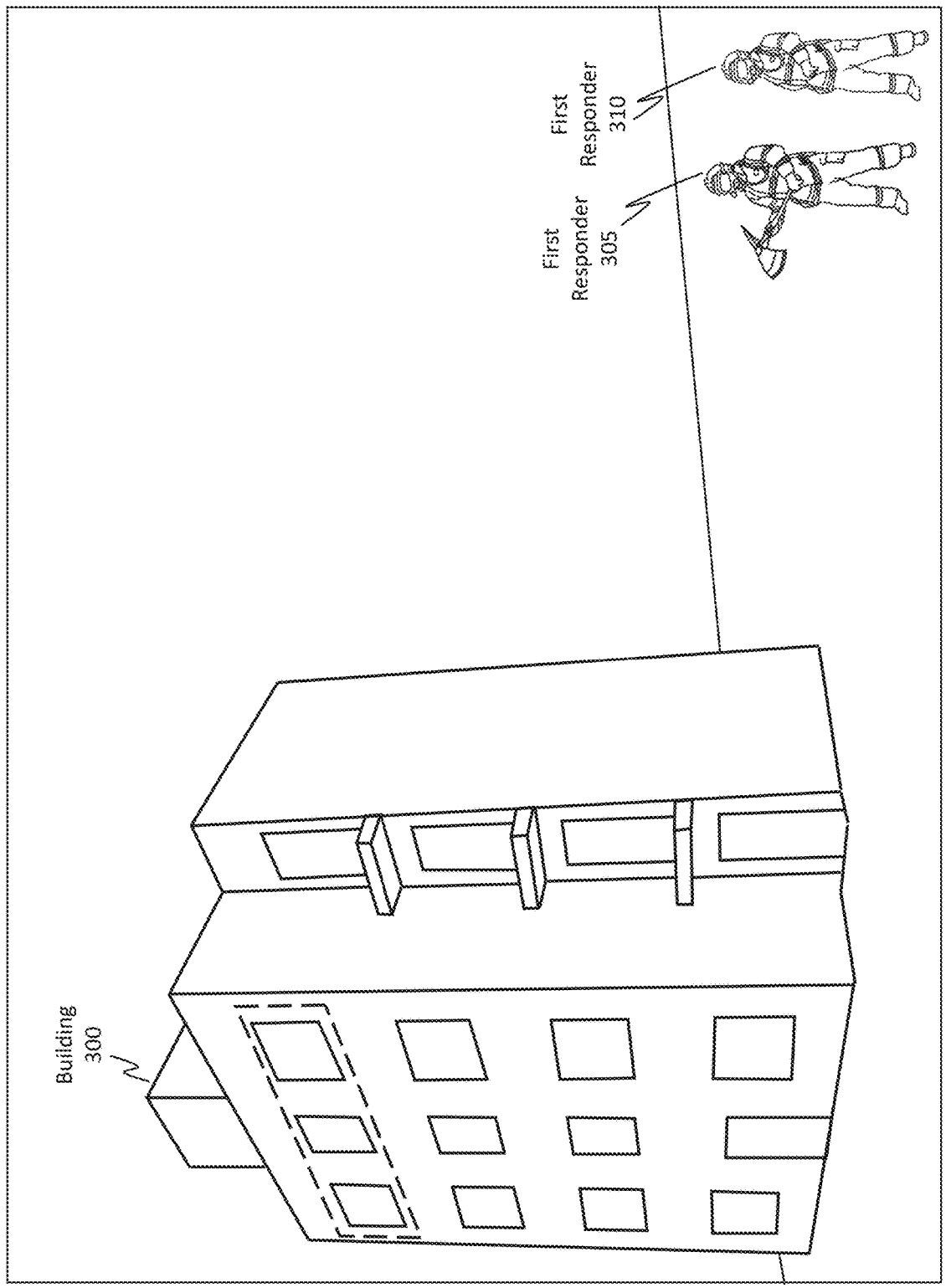
FIG. 3 illustrates an example scenario in which the disclosed principles may be practiced.
Figure 4:
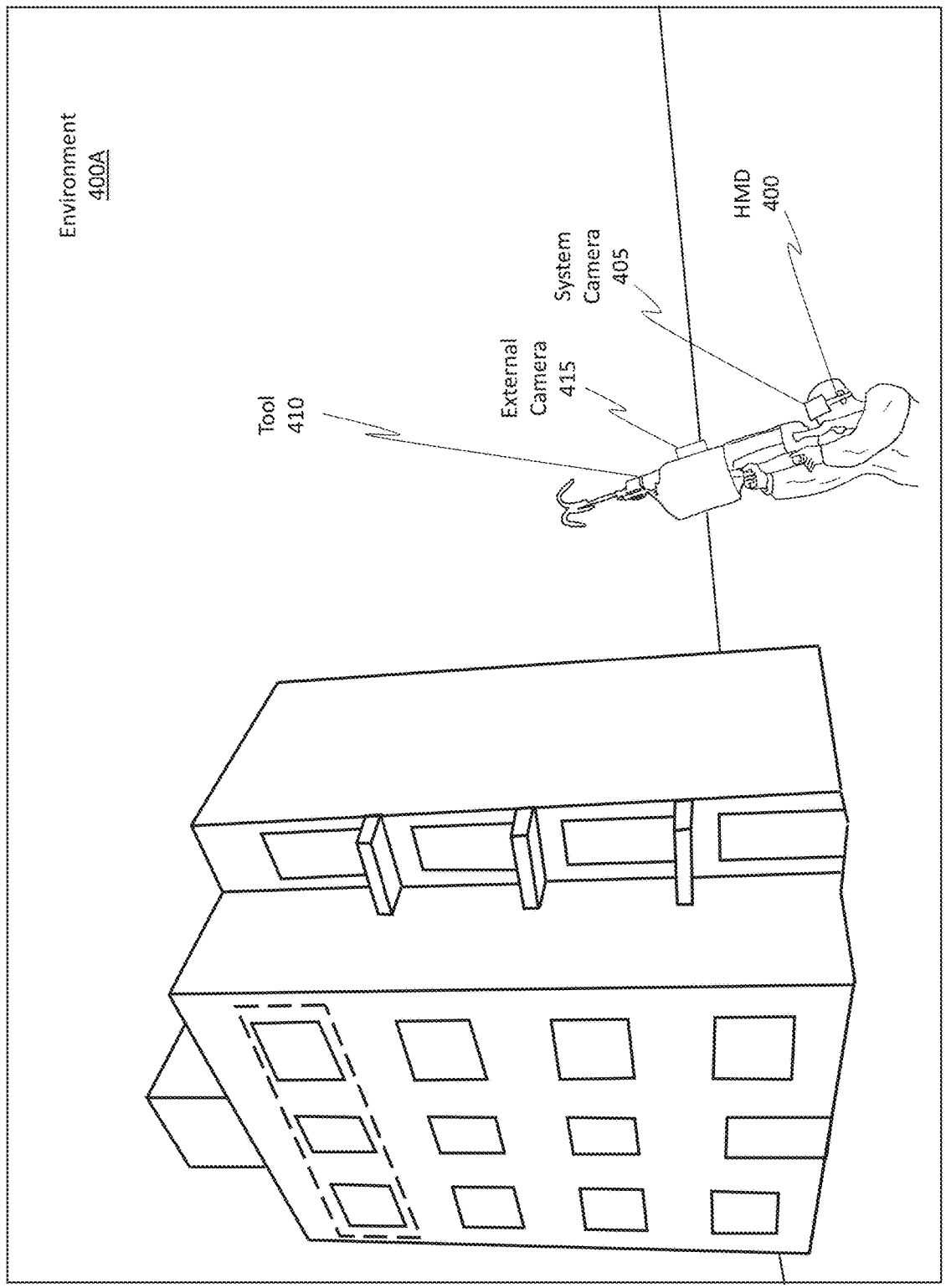
FIG. 4 illustrates another example scenario.

Attention will now be directed to FIG. 3, which illustrates an example scenario in which the HMDs discussed in FIGS. 1 and 2 may be used. FIG. 3 shows a building 300 and a first responder 305 and another first responder 310. In this example scenario, the first responders 305 and 310 are desirous to scale the building 300. FIG. 4 shows one example technique for performing this scaling feat.

FIG. 4 shows a first responder wearing an HMD 400, which is representative of the HMDs discussed thus far, in an environment 400A. HMD 400 includes a system camera 405, as discussed previously. Furthermore, the first responder is using a tool 410 that includes an external camera 415, which is representative of the external camera 255 of FIG. 2. In this case, the tool 410 is a grappling gun that will be used to shoot a rope and hook onto the building to allow the first responder to scale the building. By aligning the image content generated by the external camera 415 with the image content generated by the system camera 405, the user will be able to better discern where the tool 410 is being aimed.

Figure 5:
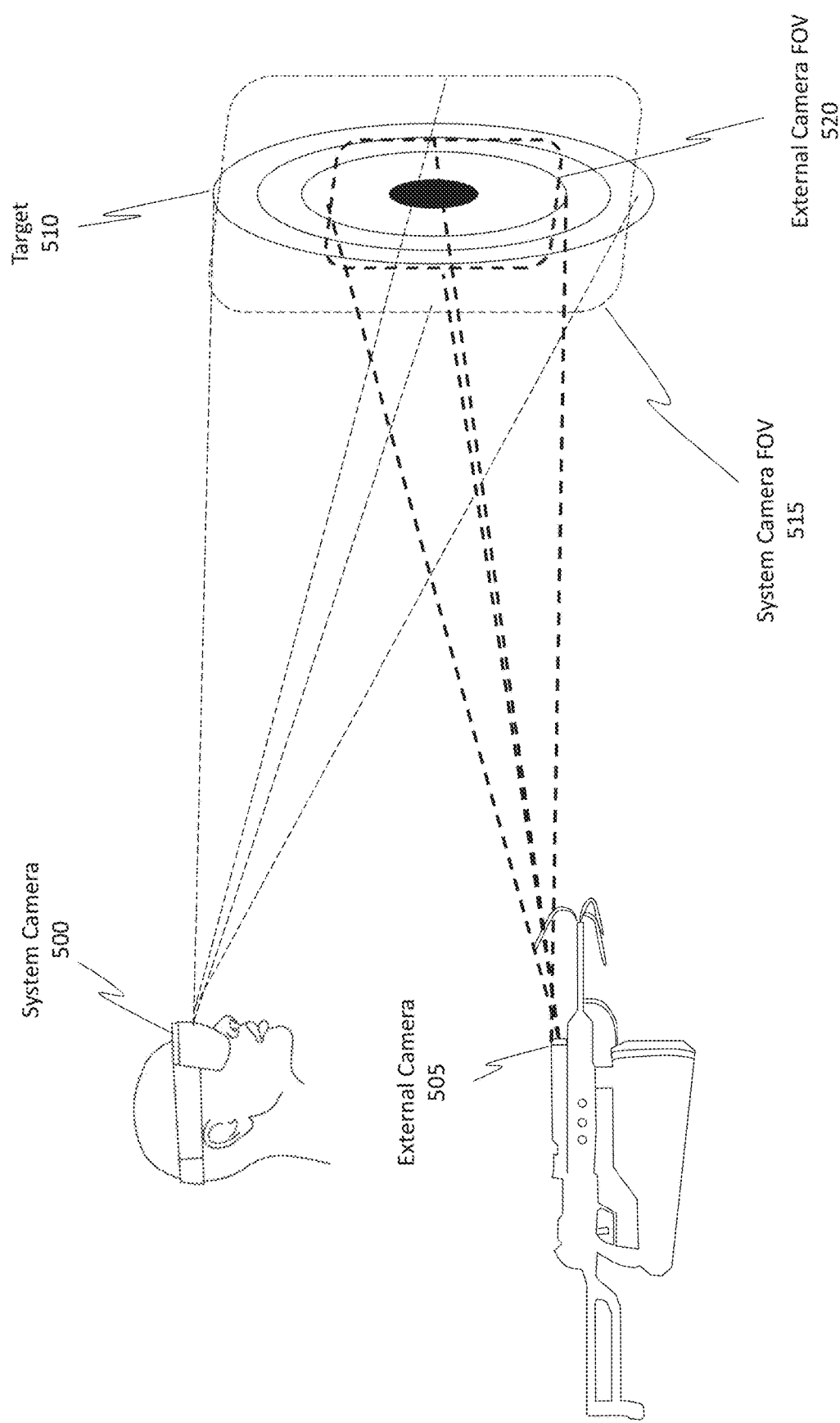
FIG. 5 illustrates how a system camera and an external camera can be used to perform the disclosed operations.

That is, in accordance with the disclosed principles, it is desirable to provide an improved platform or technique by which a user (e.g., the first responders) can aim a tool (e.g., the tool 410) using the HMD 400, the system camera 405, and the external camera 415 as a combined aiming interface. FIG. 5 shows one such example.

FIG. 5 shows a system camera 500 mounted on an HMD, where the system camera 500 is representative of the system camera 405 of FIG. 4, and a tool (e.g., a grappling gun) that includes an external camera 505, which is representative of the external camera 415. It should be noted how the optical axis of the external camera 505 is aligned with the aiming direction of the tool. As a consequence, the images generated by the external camera 505 can be used to determine where the tool is being aimed. One will appreciate how the tool can be any type of aimable tool, without limit.

In FIG. 5, both the system camera 500 and the external camera 505 are being aimed at a target 510. To illustrate, the field of view (FOV) of the system camera 500 is represented by the system camera FOV 515, and the FOV of the external camera 505 is represented by the external camera FOV 520. Notice, the system camera FOV 515 is larger than the external camera FOV 520. Typically, the external camera 505 provides a very focused view, similar to that of a scope (i.e. a high level of angular resolution). As will be discussed in more detail later, the external camera 505 sacrifices a wide FOV for an increased resolution and increased pixel density. Accordingly, in this example scenario, one can observe how in at least some situations, the external camera FOV 520 may be entirely overlapped or encompassed by the system camera FOV 515. Of course, in the event the user aims the external camera 505 in a direction where the system camera 500 is not aimed at, then the system camera FOV 515 and the external camera FOV 520 will not overlap.

Figure 6:
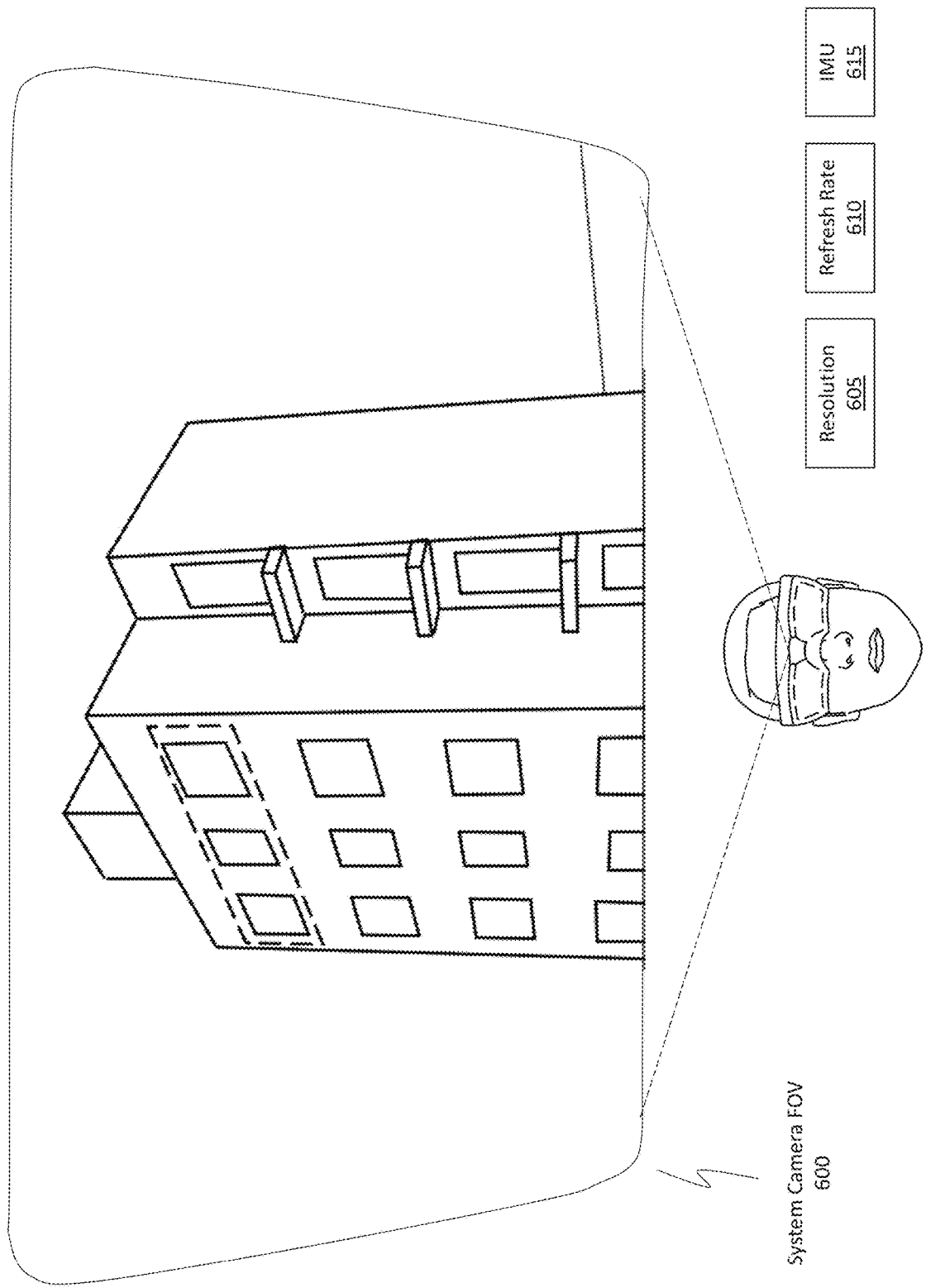
FIG. 6 illustrates the field of view (FOV) of a system camera.

FIG. 6 shows the system camera FOV 600, which is representative of the system camera FOV 515 of FIG. 5. The system camera FOV 600 will be captured by the system camera in the form of a system camera image and will potentially be displayed in the form of a passthrough image. The system camera images have a resolution 605 and are captured by the system camera based on a determined refresh rate 610 of the system camera. The refresh rate 610 of the system camera is typically between about 30 Hz and 120 Hz. Often, the refresh rate 610 is around 90 Hz or at least 60 Hz. Often, the system camera FOV 600 has at least a 55 degree horizontal FOV. The horizontal baseline of the system camera FOV 600 may extend to 65 degrees, or even beyond 65 degrees.

It should also be noted how the HMD includes an inertial measurement unit IMU 615. An IMU (e.g., IMU 615) is a type of device that measures forces, angular rates, and orientations of a body. An IMU can use a combination of accelerometers, magnetometers, and gyroscopes to detect these forces. Because both the system camera and the IMU 615 are integrated with the HMD, the IMU 615 can be used to determine the orientation or pose of the system camera (and the HMD) as well as any forces the system camera is being subjected to.

In some cases, the "pose" may include information detailing the 6 degrees of freedom, or "6 DOF," information. Generally, the 6 DOF pose refers to the movement or position of an object in three-dimensional space. The 6 DOF pose includes surge (i.e. forward and backward in the x-axis direction), heave (i.e. up and down in the z-axis direction), and sway (i.e. left and right in the y-axis direction). In this regard, 6 DOF pose refers to the combination of 3 translations and 3 rotations. Any possible movement of a body can be expressed using the 6 DOF pose.

In some cases, the pose may include information detailing the 3 DOF pose. Generally, the 3 DOF pose refers to tracking rotational motion only, such as pitch (i.e. the transverse axis), yaw (i.e. the normal axis), and roll (i.e. the longitudinal axis). The 3 DOF pose allows the HMD to track rotational motion but not translational movement of itself and of the system camera. As a further explanation, the 3 DOF pose allows the HMD to determine whether a user (who is wearing the HMD) is looking left or right, whether the user is rotating his/her head up or down, or whether the user is pivoting left or right. In contrast to the 6 DOF pose, when 3 DOF pose is used, the HMD is not able to determine whether the user (or system camera) has moved in a translational manner, such as by moving to a new location in the environment.

Determining the 6 DOF pose and the 3 DOF pose can be performed using inbuilt sensors, such as accelerometers, gyroscopes, and magnetometers (i.e. the IMU 615). Determining the 6 DOF pose can also be performed using positional tracking sensors, such as head tracking sensors. Accordingly, the IMU 615 can be used to determine the pose of the HMD.

Figure 7:
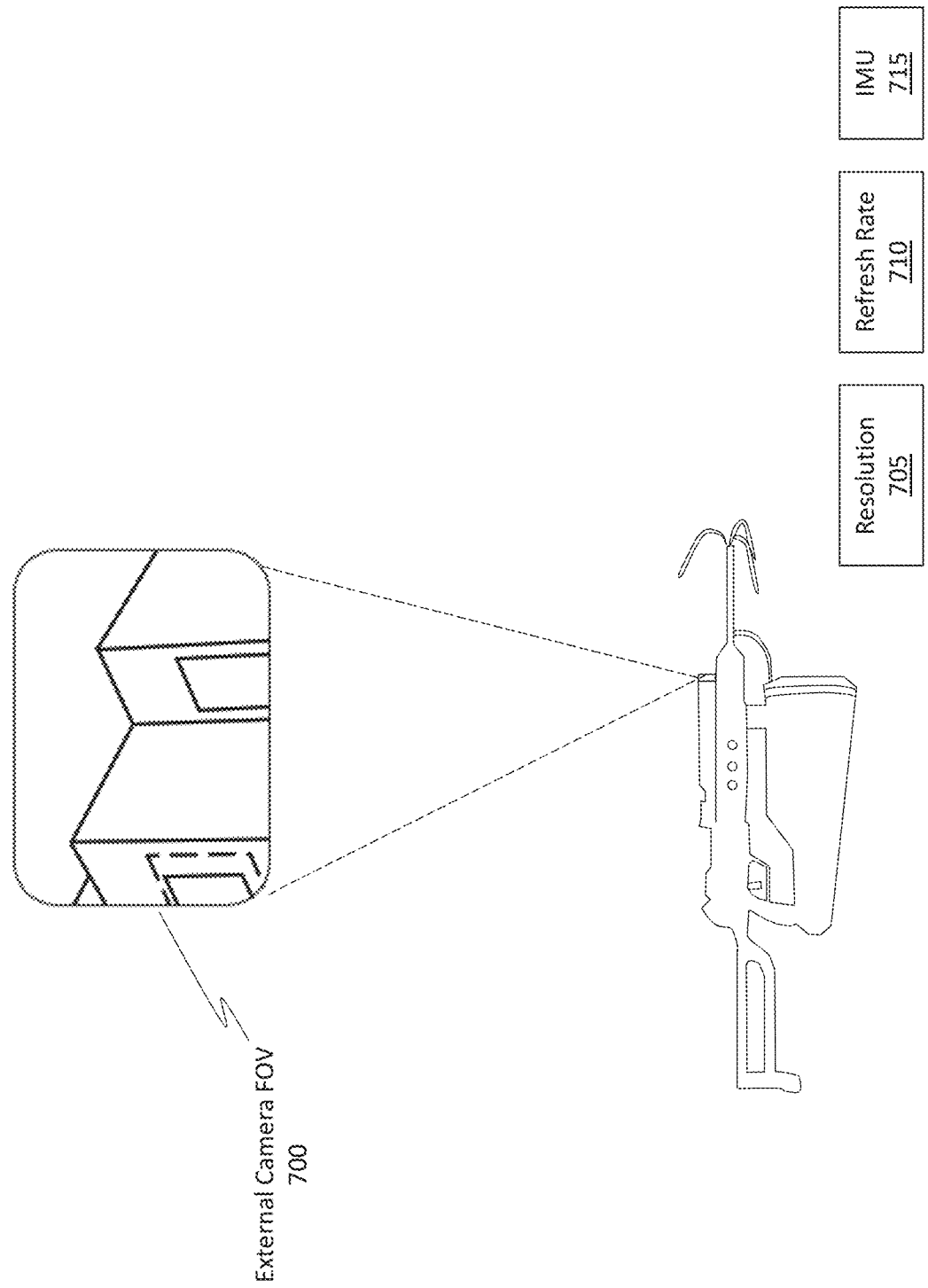
FIG. 7 illustrates the FOV of an external camera.

FIG. 7 shows an external camera FOV 700, which is representative of the external camera FOV 520 of FIG. 5. Notice, the external camera FOV 700 is smaller than the system camera FOV 600. That is, the angular resolution of the external camera FOV 700 is higher than the angular resolution of the system camera FOV 600. Having an increased angular resolution also results in the pixel density of an external camera image being higher than the pixel density of a system camera image. For instance, the pixel density of an external camera image is often 2.5 to 3 times that of the pixel density of a system camera image. As a consequence, the resolution 705 of an external camera image is higher than the resolution 605. Often, the external camera FOV 700 has at least a 19 degree horizontal FOV. That horizontal baseline may be higher, such as 20 degrees, 25 degrees, 30 degrees, or more than 30 degrees.

The external camera also has a refresh rate 710. The refresh rate 710 is typically lower than the refresh rate 610. For example, the refresh rate 710 of the external camera is often between 20 Hz and 60 Hz. Typically, the refresh rate 710 is at least about 30 Hz. The refresh rate of the system camera is often different than the refresh rate of the external camera. In some cases, however, the two refresh rates may be substantially the same.

The external camera also includes or is associated with an IMU 715. Using this IMU 715, the embodiments are able to detect or determine the orientation/pose of the external camera as well as any forces that the external camera is being subjected to. Accordingly, similar to the earlier discussion, the IMU 715 can be used to determine the pose (e.g., 6 DOF and/or 3 DOF) of the external camera sight.

In accordance with the disclosed principles, it is desirable to overlap and align the images obtained from the external camera with the images generated by the system camera to generate an overlaid and aligned passthrough image. The overlap between the two images enables the embodiments to generate multiple images and then overlay image content from one image onto another image in order to generate a composite image or an overlaid image having enhanced features that would not be present if only a single image were used. As one example, the system camera image provides a broad FOV while the external camera image provides high resolution and pixel density for a focused area (i.e. the aiming area where the tool is being aimed). By combining the two images, the resulting image will have the benefits of a broad FOV and a high pixel density for the aiming area.

It should be noted that while this disclosure primarily focuses on the use of two images (e.g., the system camera image and the external camera image), the embodiments are able to align content from more than two images having overlapping regions. For instance, suppose 2, 3, 4, 5, 6, 7, 8, 9, or even 10 integrated and/or detached cameras have overlapping FOVs. The embodiments are able to examine each resulting image and then align specific portions with one another. The resulting overlaid image may then be a composite image formed from any combination or alignment of the available images (e.g., even 10 or more images, if available). Accordingly, the embodiments are able to utilize any number of images when performing the disclosed operations and are not limited to only two images or two cameras.

Figure 8:
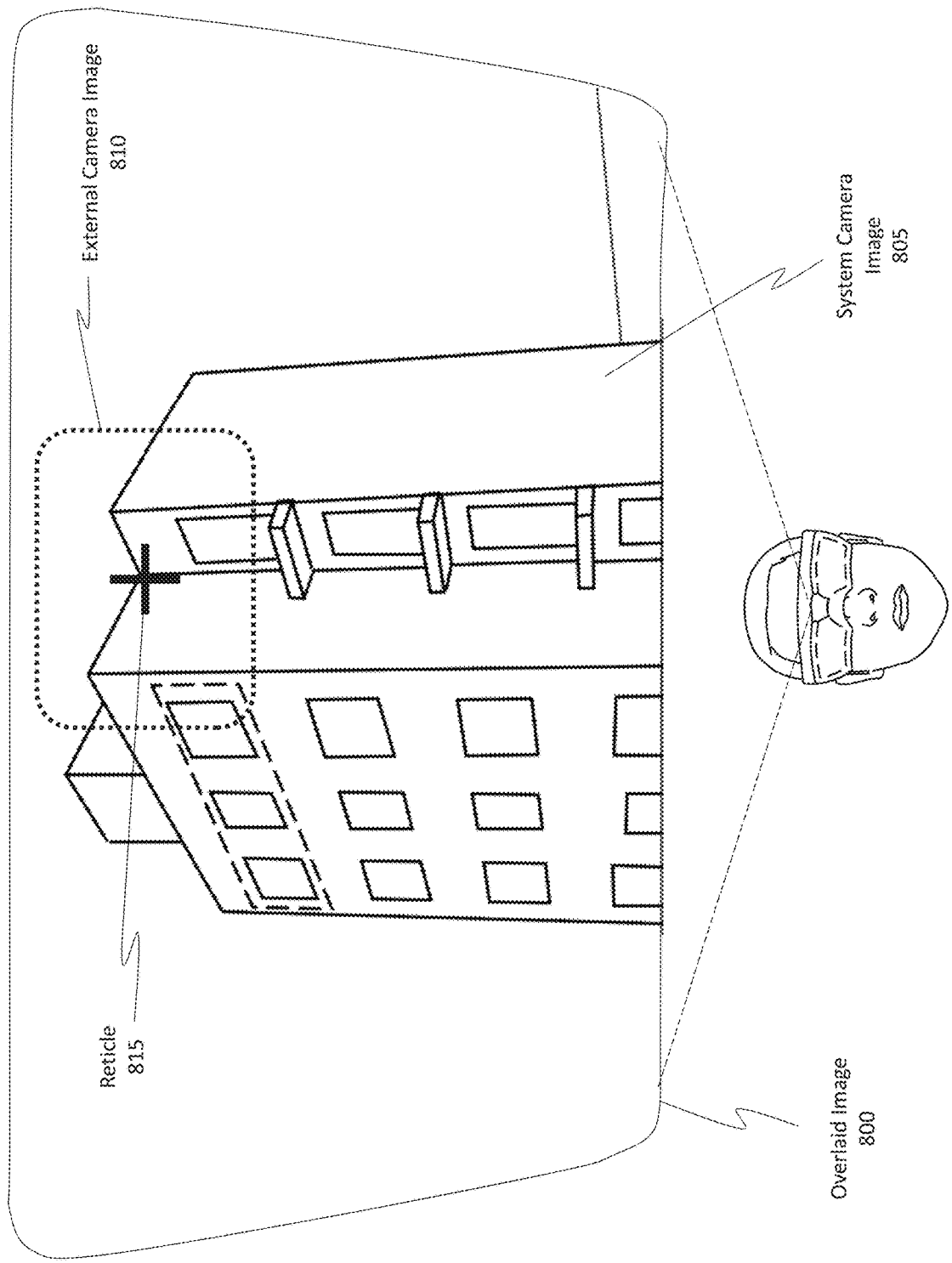
FIG. 8 illustrates an overlaid and aligned image in which image content from the external camera is overlaid onto the system image.

As another example, suppose the system camera is a low light camera and further suppose the external camera is a thermal imaging camera. As will be discussed in more detail later, the embodiments are able to selectively extract image content from the thermal imaging camera image and overlay that image content onto the low light camera image. In this regard, the thermal imaging content can be used to augment or supplement the low light image content, thereby providing enhanced imagery to the user. Additionally, because the external camera has increased resolution relative to the system camera, the resulting overlaid image will provide enhanced clarity for the areas where the pixels in the external camera image are overlaid onto the system camera image. FIG. 8 provides an example of these operations and benefits.

Image Correspondences and Alignment

In accordance with the disclosed principles, the embodiments are able to align the system camera's image with the external camera's image. That is, because at least a portion of the two cameras' FOVs overlap with one another, as was described earlier, at least a portion of the resulting images include corresponding content. Consequently, that corresponding content can be identified and then a merged, fused, or overlaid image can be generated based on the similar corresponding content. By generating this overlaid image, the embodiments are able to provide enhanced image content to the user, which enhanced image content would not be available if only a single image type were provided to a user. Both the system camera's image and the external camera's images may be referred to as "texture" images.

To merge or align the images, the embodiments are able to analyze the texture images (e.g., perform computer vision feature detection) in an attempt to find any number of feature points. As used herein, the phrase "feature detection" generally refers to the process of computing image abstractions and then determining whether an image feature (e.g., of a particular type) is present at any particular point or pixel in the image. Often, corners (e.g., the corners of a wall), distinguishable edges (e.g., the edge of a table), or ridges are used as feature points because of the inherent or sharp contrasting visualization of an edge or corner.

Any type of feature detector may be programmed to identify feature points. In some cases, the feature detector may be a machine learning algorithm. As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In accordance with the disclosed principles, the embodiments detect any number of feature points (e.g., 1, 2, 3, 4, 5, 6, 7, 8, 9, 10, 20, 30, 40, 50, 60, 70, 80, 90, 100, 200, 500, 1,000, 2,000, or more than 2,000) and then attempt to identify correlations or correspondences between the feature points detected in the system camera image and the feature points identified in the external camera image.

Some embodiments then fit the feature or image correspondence(s) to a motion model in order to overlay one image onto another image to form an enhanced overlaid image. Any type of motion model may be used. Generally, a motion model is a type of transformation matrix that enables a model, a known scene, or an object to be projected onto a different model, scene, or object.

In some cases, the motion model may simply be a rotational motion model. With a rotational model, the embodiments are able to shift one image by any number of pixels (e.g., perhaps 5 pixels to the left and 10 pixels up) in order to overlay one image onto another image. For instance, once the image correspondences are identified, the embodiments can identify the pixel coordinates of those feature points or correspondences. Once the coordinates are identified, then the embodiments can overlay the external camera sight's image onto the HMD camera's image using the rotational motion model approach described above.

In some cases, the motion model may be more complex, such as in the form of a similarity transform model. The similarity transform model may be configured to allow for (i) rotation of either one of the HMD camera's image or the external camera sight's image, (ii) scaling of those images, or (iii) homographic transformations of those images. In this regard, the similarity transform model approach may be used to overlay image content from one image onto another image. Accordingly, in some cases, the process of aligning the external camera image with the system camera image is performed by (i) identifying image correspondences between the images and then, (ii) based on the identified image correspondences, fitting the correspondences to a motion model such that the external camera image is projected onto the system camera image.

Another technique for aligning images includes using IMU data to predict poses of the system camera and the external camera. Once the two poses are estimated or determined, the embodiments then use those poses to align one or more portions of the images with one another. Once aligned, then one or more portions of one image (which portions are the aligned portions) are overlaid onto the corresponding portions of the other image in order to generate an enhanced overlaid image. In this regard, IMUs can be used to determine poses of the corresponding cameras, and those poses can then be used to perform the alignment processes.

FIG. 8 shows a resulting overlaid image 800 comprising portions (or all) of a system camera image 805 (i.e. an image generated by the system camera) and an external camera image 810 (i.e. an image generated by the external camera). Optionally, additional image artifacts can be included in the overlaid image 800, such as perhaps a reticle 815 used to help the user aim the tool. By aligning the image content, a user of the tool can determine where the tool is being aimed without having to look down the tool's sights. Instead, the user can discern where the tool is being aimed by simply looking at the content displayed in his/her HMD.

Figure 9:
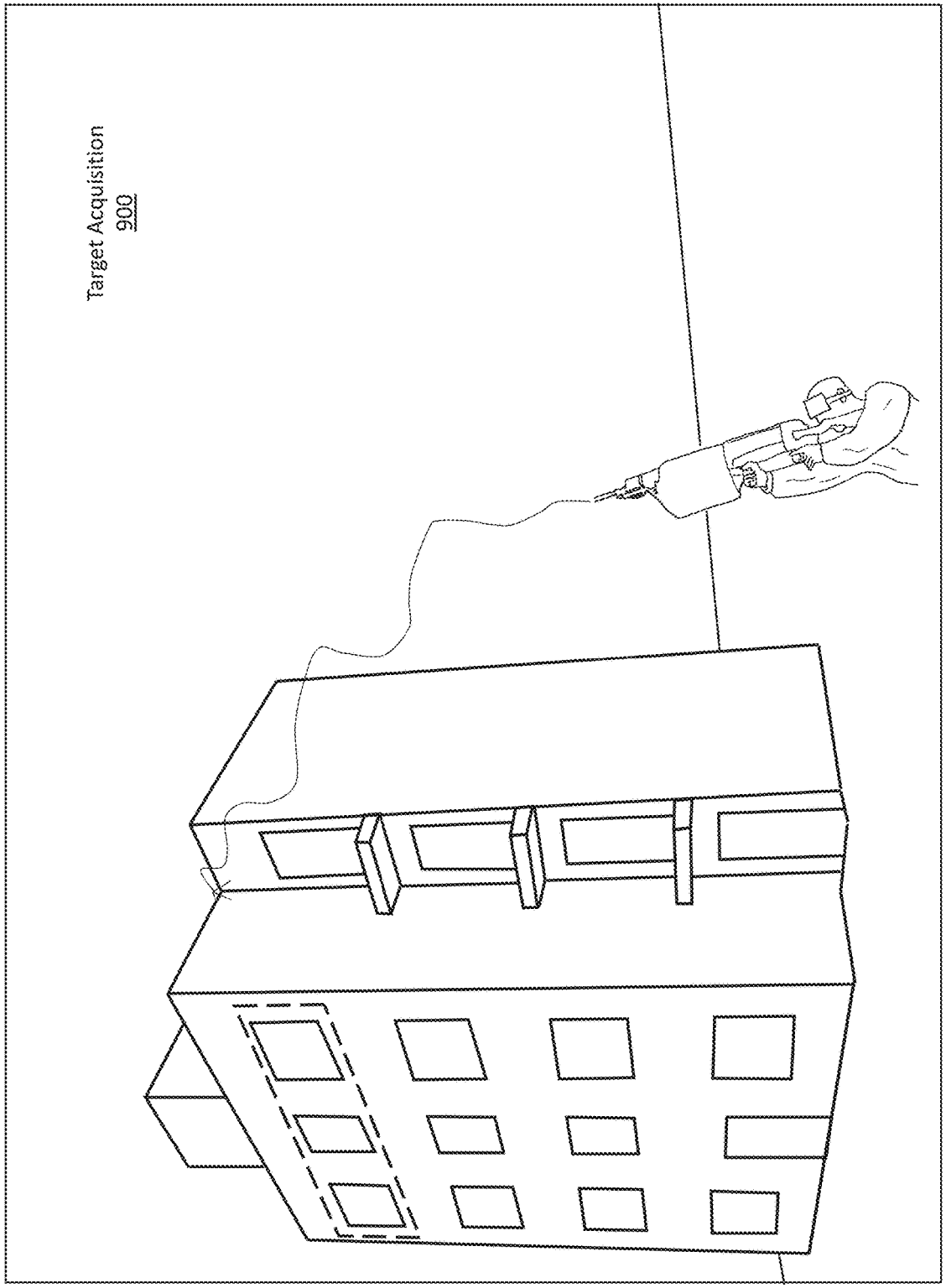
FIG. 9 illustrates another example scenario in which the principles may be practiced.

Providing the enhanced overlaid image 800 allows for rapid target acquisition, as shown by target acquisition 900 in FIG. 9. That is, a target can be acquired (i.e. the tool is accurately aimed at a desired target) in a fast manner because the user no longer has to take time to look through the tool's sights.

Improved Image Alignment in Response to Camera Movement

There is often latency or a time delay between when the overlaid image is displayed and when the images used to generate the overlaid image are generated. This time delay results in a scenario where the user is viewing delayed data, which means the displayed reticle 815 in FIG. 8 may not truly reflect the actual aiming position of the tool. What is needed, therefore, is an improved technique to compensate for delays that occur between image generation and image display. The remaining figures will describe a technique for addressing such issues.

Figure 10:
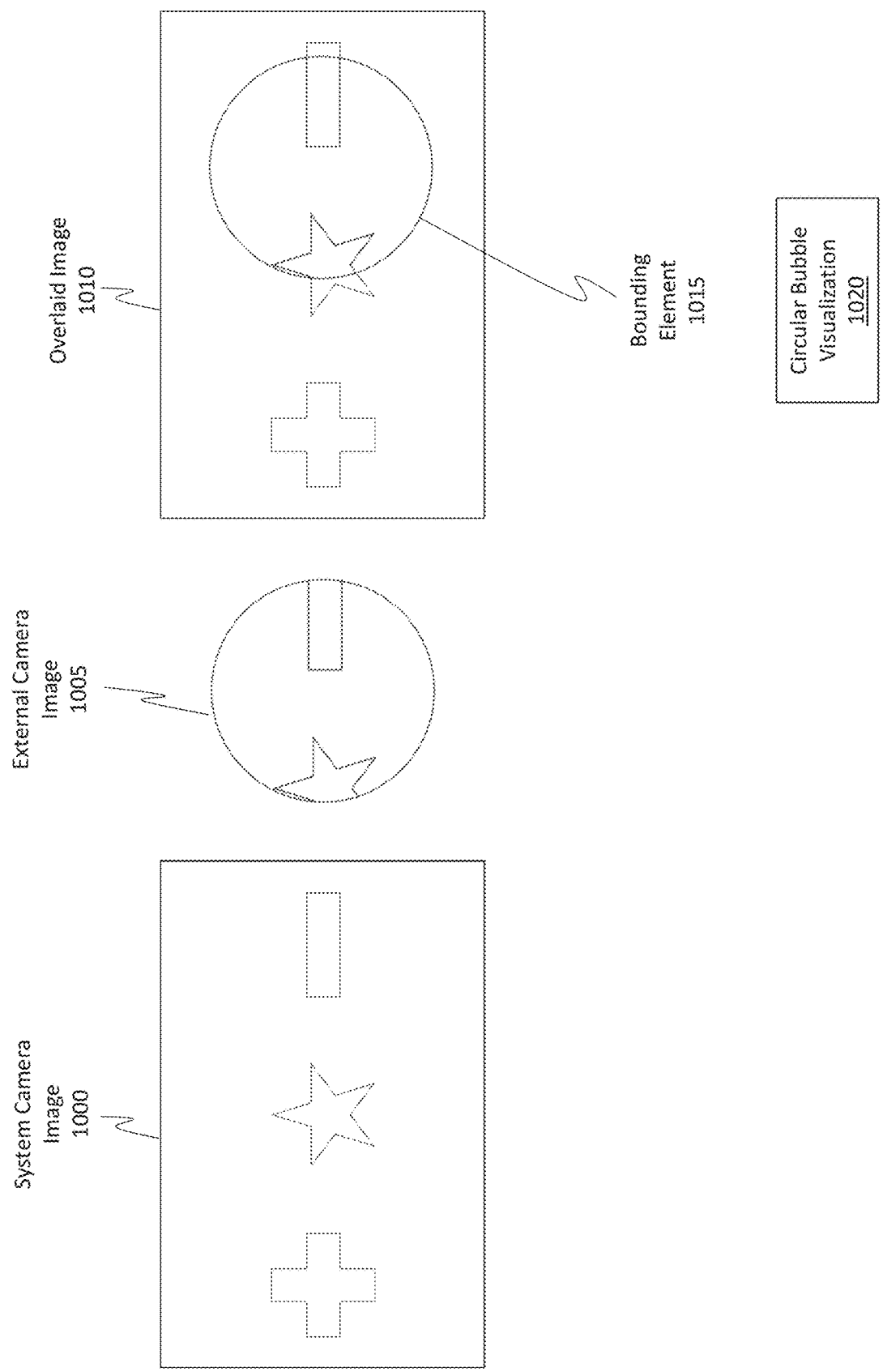
FIG. 10 illustrates how an external camera image can be overlaid onto a system camera image.

FIG. 10 shows an abstracted version of the images discussed thus far. In particular, FIG. 10 shows a system camera image 1000 and an external camera image 1005. As discussed, it is desirable to generate an overlaid image 1010 comprising portions extracted or obtained from the system camera image 1000 and portions extracted or obtained from the external camera image 1005. Notice, in some embodiments, the overlaid image 1010 includes a bounding element 1015 encompassing pixels that are obtained from the external camera image 1005 and/or from the system camera image 1000. Optionally, the bounding element 1015 may be in the form of a circular bubble visualization 1020. Other shapes may be used for the bounding element 1015, however.

Figure 11:
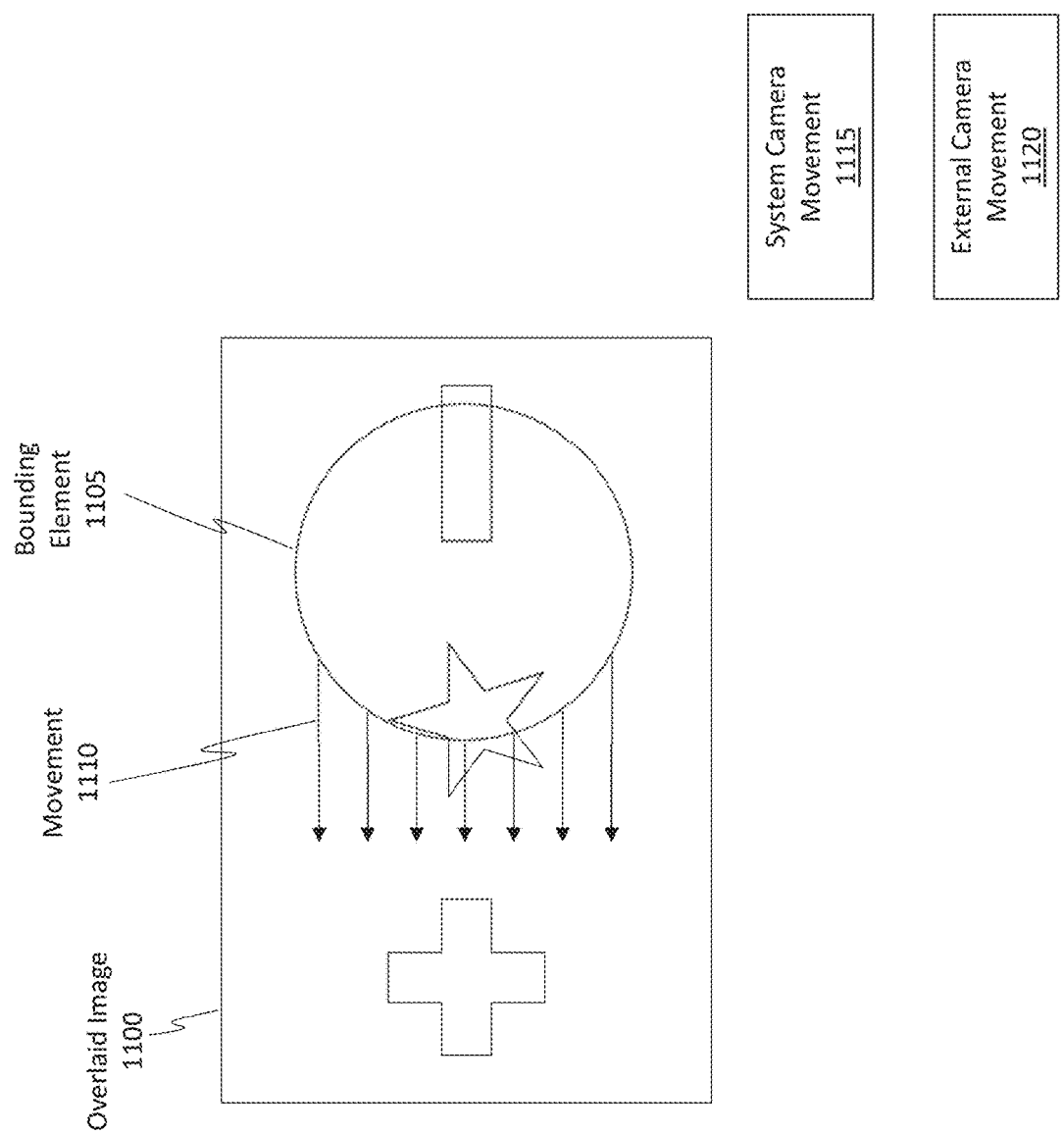
FIG. 11 illustrates how movement of either the system camera or the external camera can cause latency in the resulting overlaid image.
Figure 12:
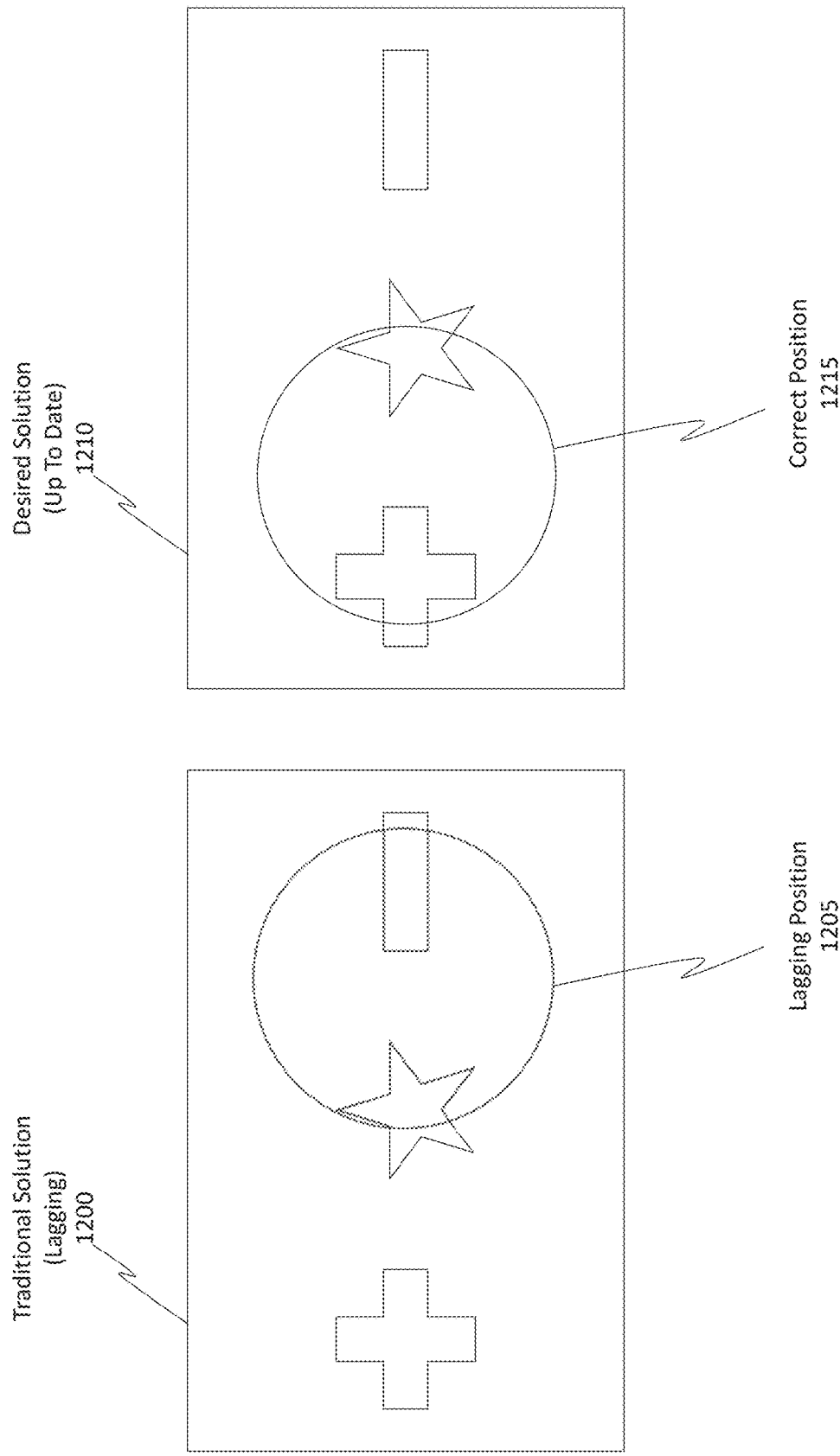
FIG. 12 illustrates an example of the lagging or latency effect.

FIG. 11 shows an overlaid image 1100, which is representative of the overlaid image 1010 of FIG. 10, and a bounding element 1105, which is representative of the bounding element 1015. Here, movement 1110 is also illustrated. Movement 1110 may correspond to a movement of the system camera, as shown by system camera movement 1115, and/or movement of the external camera, as shown by the external camera movement 1120. As discussed previously, there may be a time delay between when the overlaid image 1100 is generated and displayed and when the system camera image and the external camera image are generated. During this time period, if the movement 1110 occurs, then the resulting overlaid image 1100 will no longer be up-to-date in that it will reflect a past scenario (i.e. the location of the bounding element 1105 will be in the wrong position). FIG. 12 provides additional clarification.

FIG. 12 shows the traditional solution (lagging) 1200 where the bounding element is displayed at a lagging position 1205 that does not reflect the movement 1110 of FIG. 11. Such an image is not desirable to display to a user.

In contrast, the desired solution (up to date) 1210 shows the bounding element in a correct position 1215 to account for the movement 1110 of FIG. 11. Such an image is desirable to display to the user.

Figure 13:
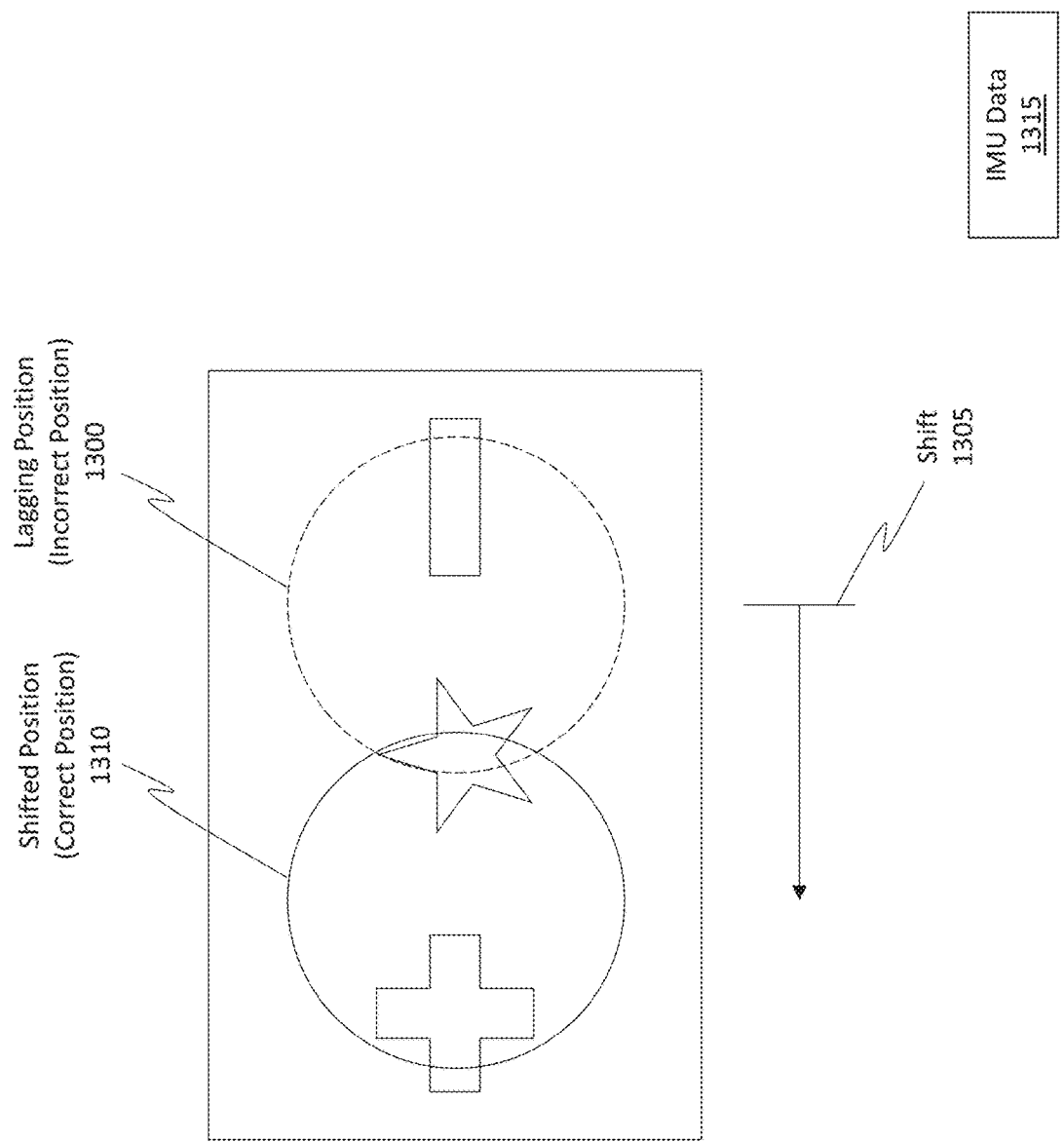
FIG. 13 illustrates a technique for shifting a bounding element in an effort to minimize the effects of latency.

FIG. 13 shows a scenario where the bounding element is originally in a lagging position (incorrect position) 1300, but how the bounding element can be shifted (as shown by shift 1305) to a shifted position (correct position) 1310. To perform this shift, the embodiments rely on IMU data 1315, which includes IMU data from the IMUs associated with the system camera and the external camera. Generally, acquiring image data and manipulating that image data (e.g., by performing a reprojection) takes a relatively longer amount of time as compared to manipulating data based on IMU data. With that understanding, then, the embodiments selectively move the bounding element to a new position based on updated IMU data that is obtained after the original system camera image and external camera image are generated.

Moving the bounding element (including, perhaps, moving the reticle) enables the embodiments to display an updated positional relationship between the system camera and the external camera without having to acquire new image content to determine that updated position; instead, the IMU data is used to determine the updated positions (which occur as a result of movement). Therefore, the embodiments are able to dynamically shift the bounding element to reflect any movements that have occurred since the time when the system camera image and the external camera image were originally generated. It should be noted, only the bounding element is being moved; the external camera image is not being realigned or reprojected. Further details on this aspect will be provided later.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 14A:
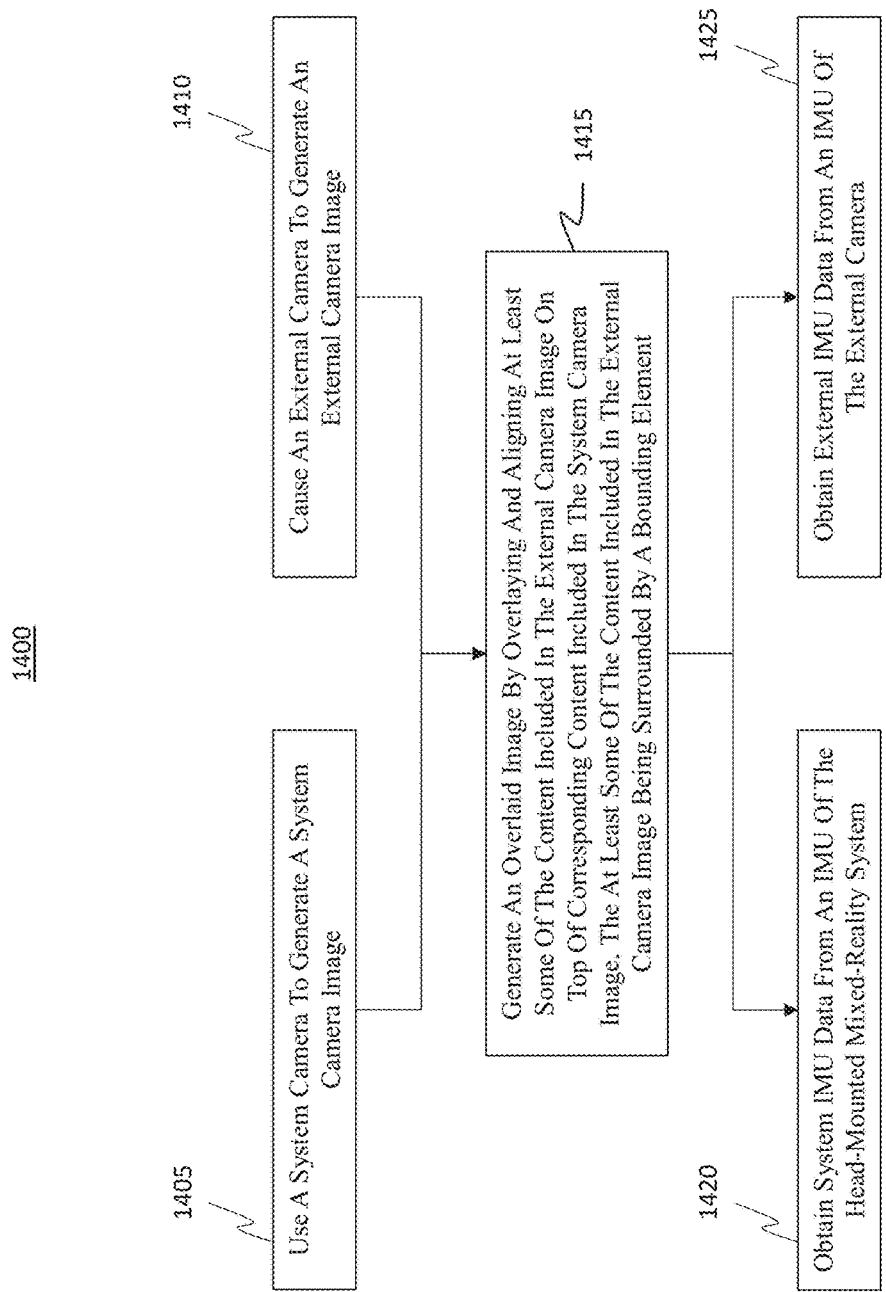
FIGS. 14A and 14B illustrate a flowchart of an example method for minimizing the effects of latency.
Figure 14B:
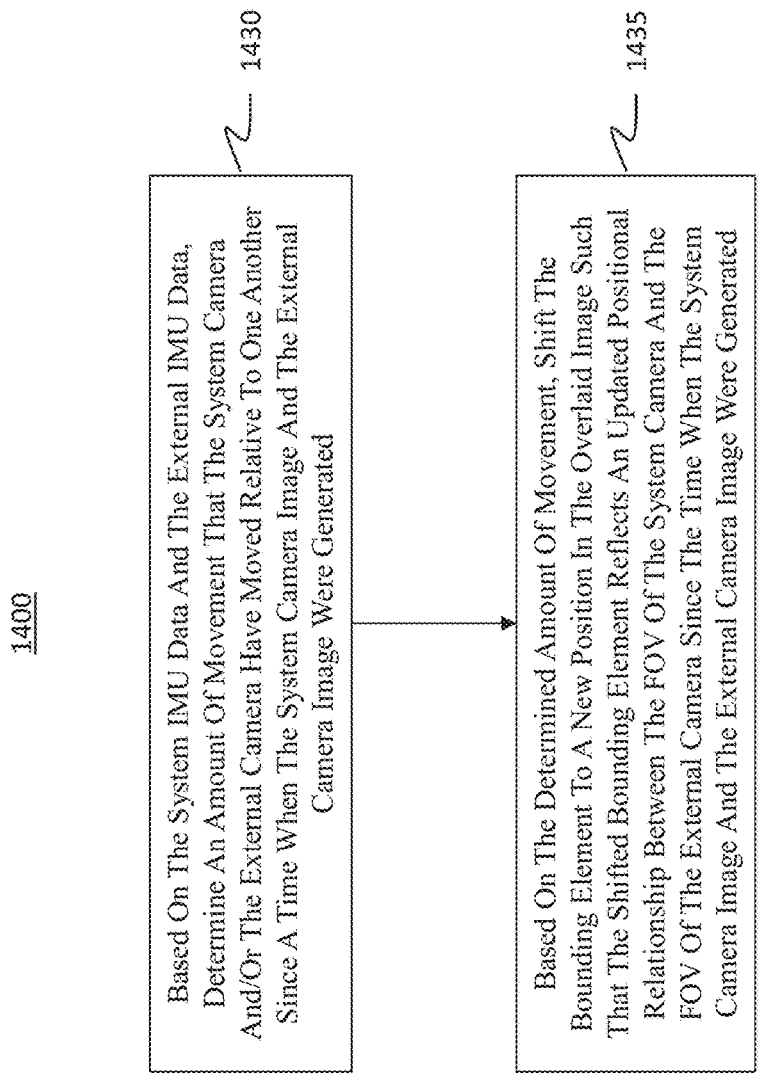

Attention will now be directed to FIGS. 14A and 14B, which illustrate a flowchart of an example method 1400 for updating a position of overlaid image content using IMU data to reflect subsequent changes in camera positions in order to minimize latency effects. Method 1400 may be performed using the HMDs, system cameras, and external cameras mentioned thus far.

Initially, method 1400 includes an act (act 1405) of using a system camera (e.g., system camera 405 of FIG. 4) of a head-mounted mixed-reality system (e.g., HMD 400) to generate a system camera image (e.g., system camera image 1000 of FIG. 10) of an environment (e.g., environment 400A in FIG. 4) in which the system is operating. In parallel with act 1405, method 1400 includes an act (act 1410) of causing an external camera (e.g., external camera 415 of FIG. 4) to generate an external camera image (e.g., external camera image 1005 of FIG. 10) of the environment. Notably, a FOV of the system camera overlaps a FOV of the external camera. As a consequence, content included in the external camera image is also included in the system camera image. The system camera and the external camera can be one or more of a visible light camera, a low light camera, or a thermal imaging camera, among others.

Figure 15:
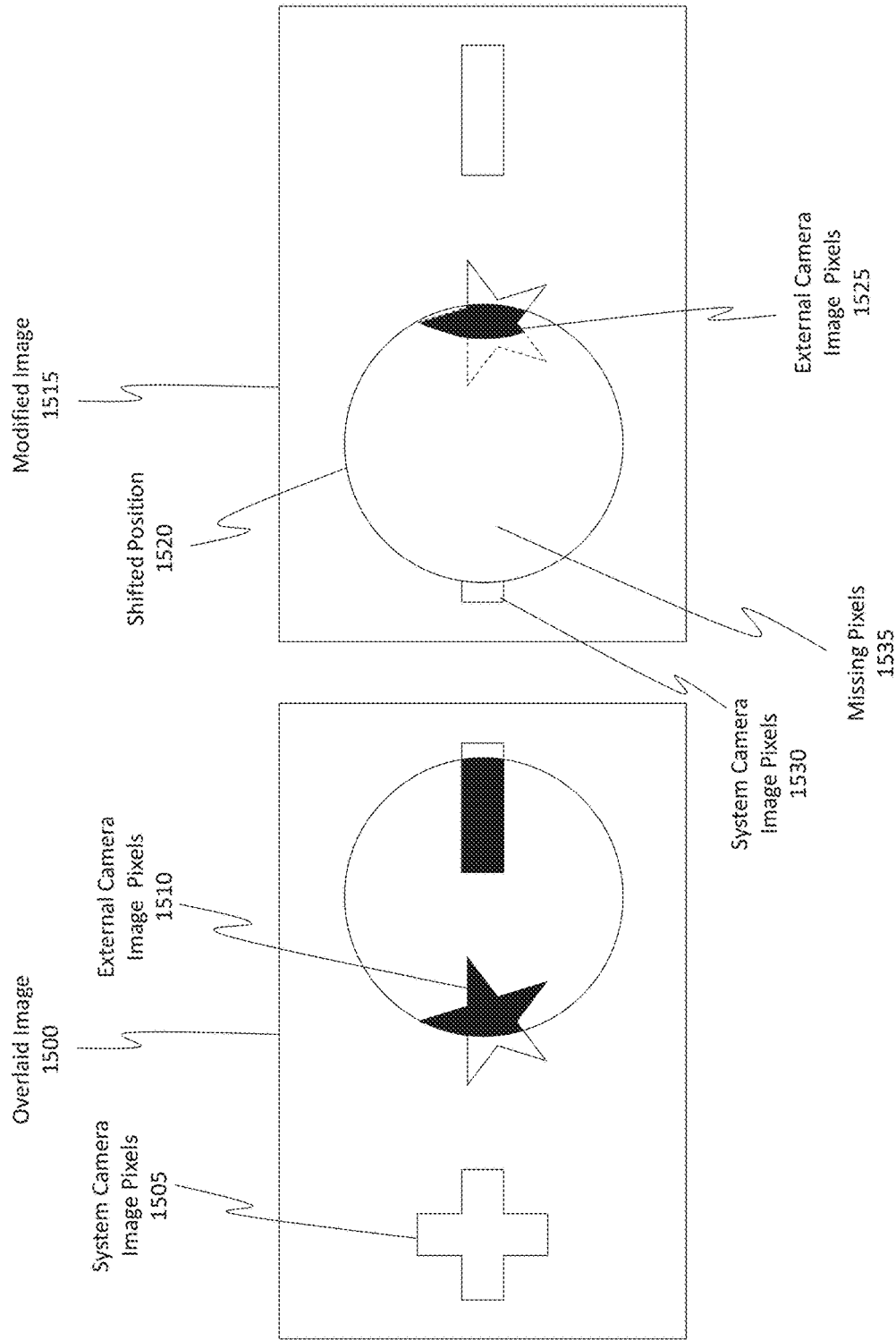
FIG. 15 illustrates various features of an overlaid image.

Act 1415 then involves generating an overlaid image (e.g., overlaid image 1010 of FIG. 10) by overlaying and aligning at least some of the content included in the external camera image on top of corresponding content included in the system camera image. Here, the overlaid content pulled from the external camera image is surrounded by a bounding element (e.g., bounding element 1015 in FIG. 10), as was discussed earlier. FIG. 15 provides additional context regarding method acts 1405-1415.

FIG. 15 shows how an overlaid image 1500 can be generated by merging and aligning content from a system camera image and an external camera image in the manner discussed previously. Notice, the overlaid image 1500 includes pixels from both the system camera image (e.g., system camera image pixels 1505) and the external camera image (e.g., external camera image pixels 1510—the darkened areas). Also, notice how the external camera image pixels 1510 are encompassed by a bounding element (not labeled, but evident from the illustration). The overlaid image 1500 corresponds to the overlaid image mentioned in act 1415 of method 1400.

Returning to FIG. 14A, method 1400 further includes an act (act 1420) of obtaining system IMU data from an IMU of the system. By way of example, the embodiments are able to obtain IMU data from the IMU 615 associated with the HMD and the system camera.

In parallel with act 1420, there is an act (act 1425) of obtaining external IMU data from an IMU of the external camera. By way of example, the embodiments are able to obtain IMU data from the IMU 715 associated with the external camera.

In FIG. 14B, method 1400 the lists a number of additional acts. Specifically, based on the system IMU data and the external IMU data, there is an act (act 1430) of determining an amount of movement that the system camera and/or the external camera have moved relative to one another since a time when the system camera image and the external camera image were generated.

Based on the determined amount of movement, there is then an act (act 1435) of shifting the bounding element to a new position in the overlaid image. As a consequence, the shifted bounding element reflects an updated positional relationship between the FOV of the system camera and the FOV of the external camera since the time when the system camera image and the external camera image were generated. FIG. 15 also illustrates this shifting effect.

FIG. 15 shows a modified image 1515, which is representative of the overlaid image described in method act 1435. Here, the bounding element has been moved or shifted to a shifted position 1520. Notice, the modified image 1515 includes pixels obtained from the external camera image, as shown by external camera image pixels 1525, and pixels obtained from the system camera image, as shown by the system camera image pixels 1530.

Notably, it is normally the case that pixels encompassed by the bounding element belonged to or were obtained from the external camera image. By way of additional clarification, prior to shifting the bounding element (e.g., prior to act 1435), pixels bounded by the bounding element include pixels obtained only from the external camera image. FIG. 15 shows how the overlaid image 1500 includes a bounding element and how the pixels included in the bounding element (e.g., external camera image pixels 1510) were obtained only from the external image.

Figure 16:
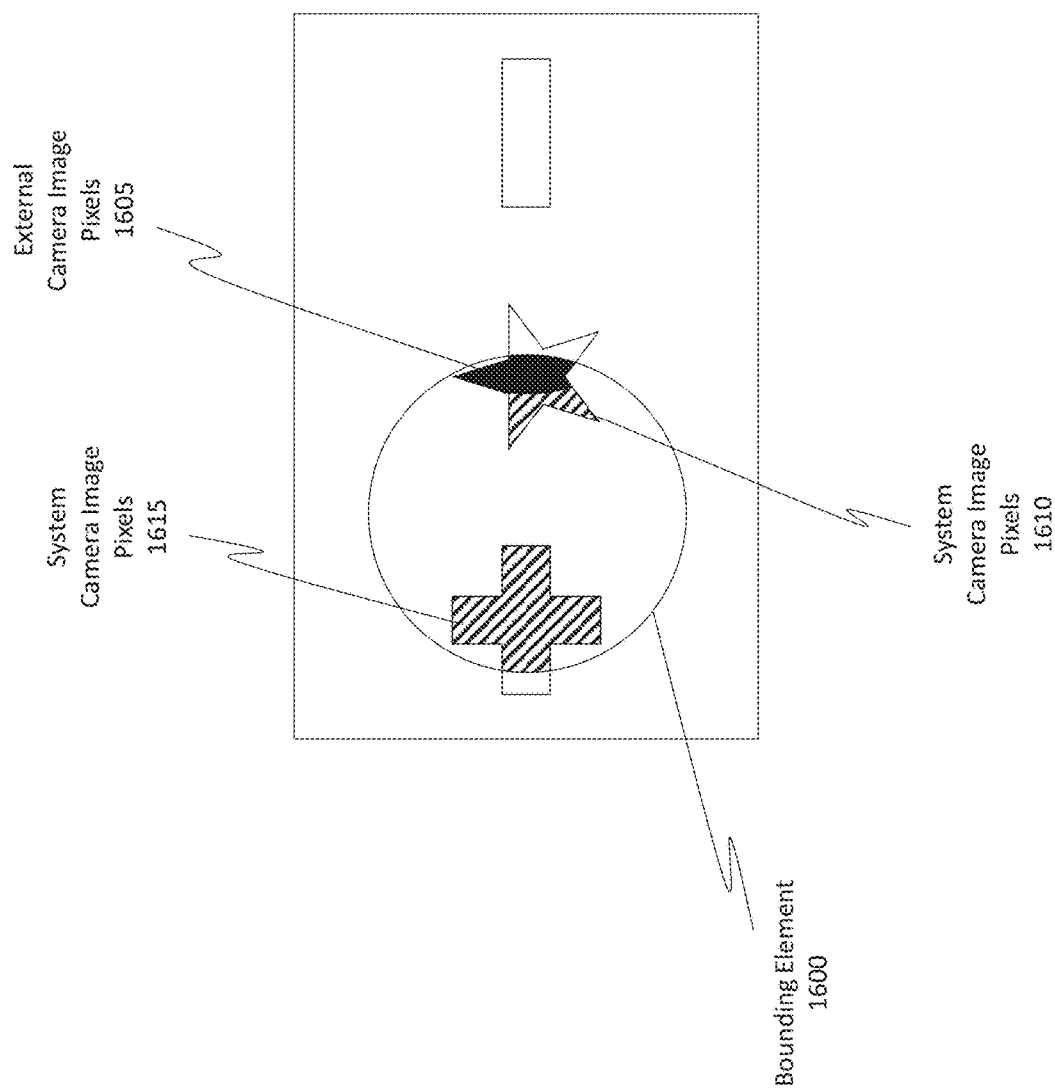
FIG. 16 illustrates how pixel data from the system camera image can be exposed or used to fill in certain areas within a bounding element.

If only pixels obtained from the external camera image were allowed to be included in the bounding element, then the resulting modified image 1515 would have missing pixels 1535. In order words, because only the external camera image pixels 1510 were originally available and because the shift caused the bounding element to be shifted to a new position, pixels would be lost, as shown by the missing pixels 1535. Such a scenario is not desirable. As such, the embodiments "fill in" certain areas encompassed by the bounding element with pixels obtained from the system camera image in an effort to ensure that the area surrounded by the bounding element is fully represented without missing content. FIG. 16 shows an example of this operation.

FIG. 16 shows how the bounding element 1600 now encompasses pixels that are obtained from both the system camera image and the external camera image. To illustrate, notice how the bounding element 1600 bounds or encompasses external camera image pixels 1605, system camera image pixels 1610, and system camera image pixels 1615. Previously (e.g., in the overlaid image generated in method act 1415), the bounding element 1600 encompassed pixels obtained only from the external camera. The pixels obtained from the external camera were shown by the external camera image pixels 1510 in FIG. 15 (i.e. the darkened areas).

When the bounding element is shifted to a new position (e.g., moved to the left in this case), the external camera image pixels 1605 are the only pixels from the external camera image that remain within the bounding element 1600. Suppose a constraint were imposed where the bounding element 1600 was allowed to encompass only pixels obtained from the external camera image. If that were the case, then only the portion of the star shown in FIG. 15 (i.e. the external camera image pixels 1525) would be displayed, and the right portion of the plus sign would be missing, as shown by the missing pixels 1535. To avoid such a scenario, the embodiments refrain from implementing the above-described constraint and instead allow the bounding element to encompass pixels that are obtained from sources other than just the external camera image. In essence, pixels can be "filled in" using the system camera image to provide a complete view within the bounding element 1600.

To illustrate, the system camera image pixels 1610 and 1615, which are pixels obtained from the system camera image, can be used to fill in the areas that would not have been filled in if the above-described constraint were imposed.

By way of additional clarification, the process of shifting the bounding element to the new position in the overlaid image may include a number of steps. One step involves identifying pixels included within the external camera image. Another step involves determining that, as a result of shifting the bounding element to the new position, some, but not all, image content that is now to be included within the shifted bounding element are not representable by the identified pixels included within the external camera image. For instance, the embodiments identify a scenario where pixels are missing (e.g. the missing pixels 1535 in FIG. 15).

Then, for the some, but not all, image content that is now to be included in the shifted bounding element and that is not representable by the identified pixels included within the external camera image, the embodiments selectively use pixels from the system camera image (e.g., system camera image pixels 1610 and 1615 in FIG. 16) to display that image content. As a consequence, the shifted bounding element bounds pixels originating from the system camera image and pixels originating from the external camera image.

Figure 17:
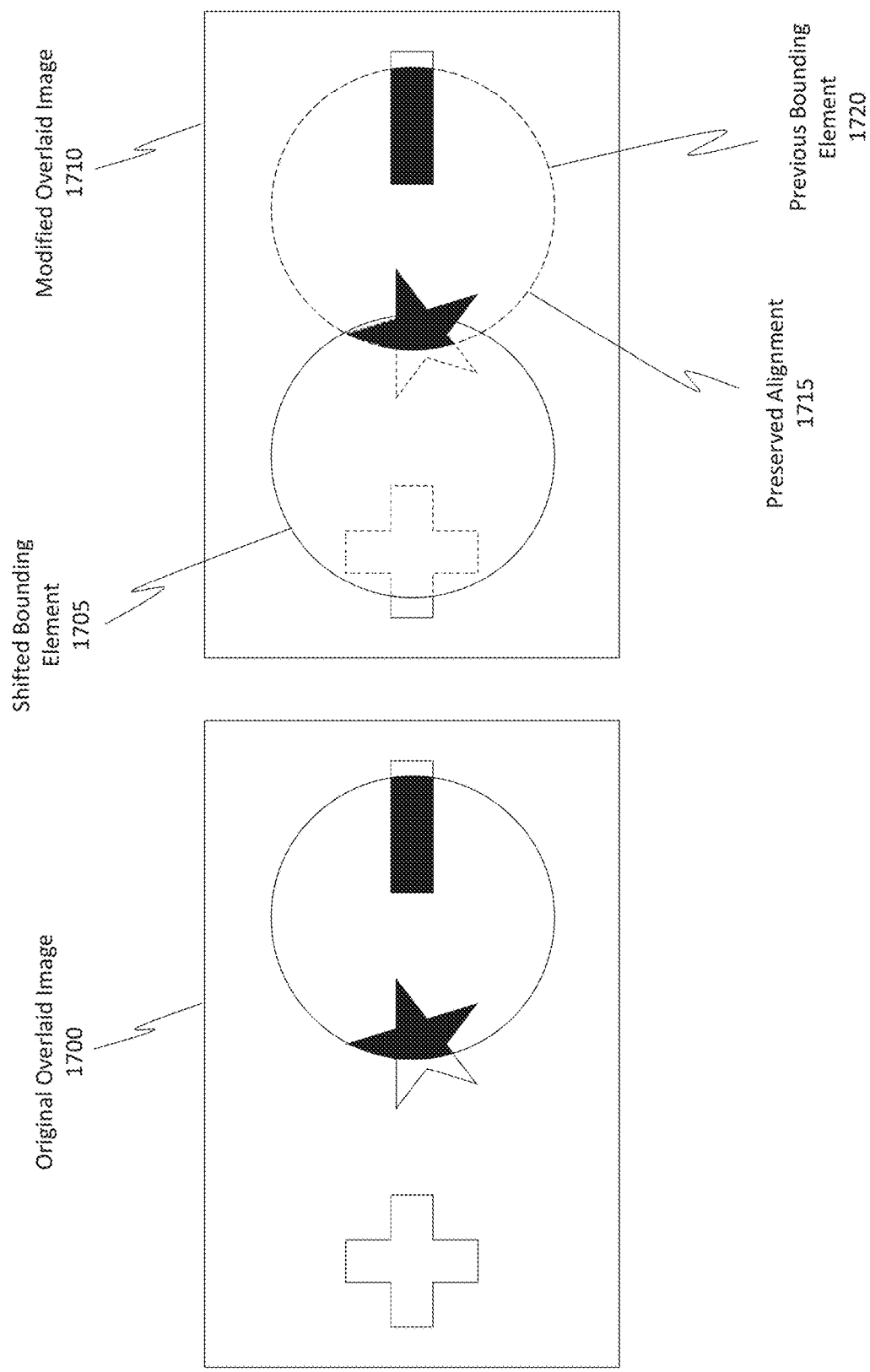
FIG. 17 illustrates how an original alignment between the external camera image and the system camera image is preserved.

It should be noted that shifting the bounding element to the new position does not trigger the reprojection of image content or pixels. That is, the original alignment between the system camera image and the external camera image remains intact; only the position of the bounding element has changed. FIG. 17 provides clarification regarding this concept.

FIG. 17 shows an original overlaid image 1700, which is representative of the overlaid image discussed in method act 1415 of FIG. 14A. As a result of performing the other operations recited in method 1400, the bounding element is shifted to a new position, as reflected by the shifted bounding element 1705 in the modified overlaid image 1710.

In FIG. 17, the black pixels correspond to pixels obtained from the external camera image. Notice, even though the bounding element has shifted to a new position, the original alignment between the external camera image and the system camera image is preserved, as shown by the preserved alignment 1715. What this means is that in some implementations, high resolution pixels will be displayed in areas outside of the shifted bounding element 1705.

Notably, the previous bounding element 1720 reflects the original position of the bounding element before being shifted. When the modified overlaid image 1710 is displayed, the previous bounding element 1720 will not be displayed; instead, the shifted bounding element 1705 will be displayed. In this regard, only the bounding element is shifted, and the content included in the external camera image is not shifted such that the external camera image remains overlaid on and aligned with the system camera image despite the bounding element being shifted to a new position.

To reiterate, it should be noted that the pixels obtained from the external camera image (i.e. the darkened areas in FIG. 17), even those that are not currently encompassed by the shifted bounding element 1705 (e.g., those dark pixels in the minus sign), can still be displayed. Not being encompassed in the shifted bounding element 1705 will not prevent those pixels from being displayed. As such, the embodiments preserve the original alignment of the external camera image and the system camera image and focus on shifting only the bounding element in response to detected movements, which are detected and measured using IMU data obtained from the IMUs associated with the system camera and the external camera.

Figure 18:
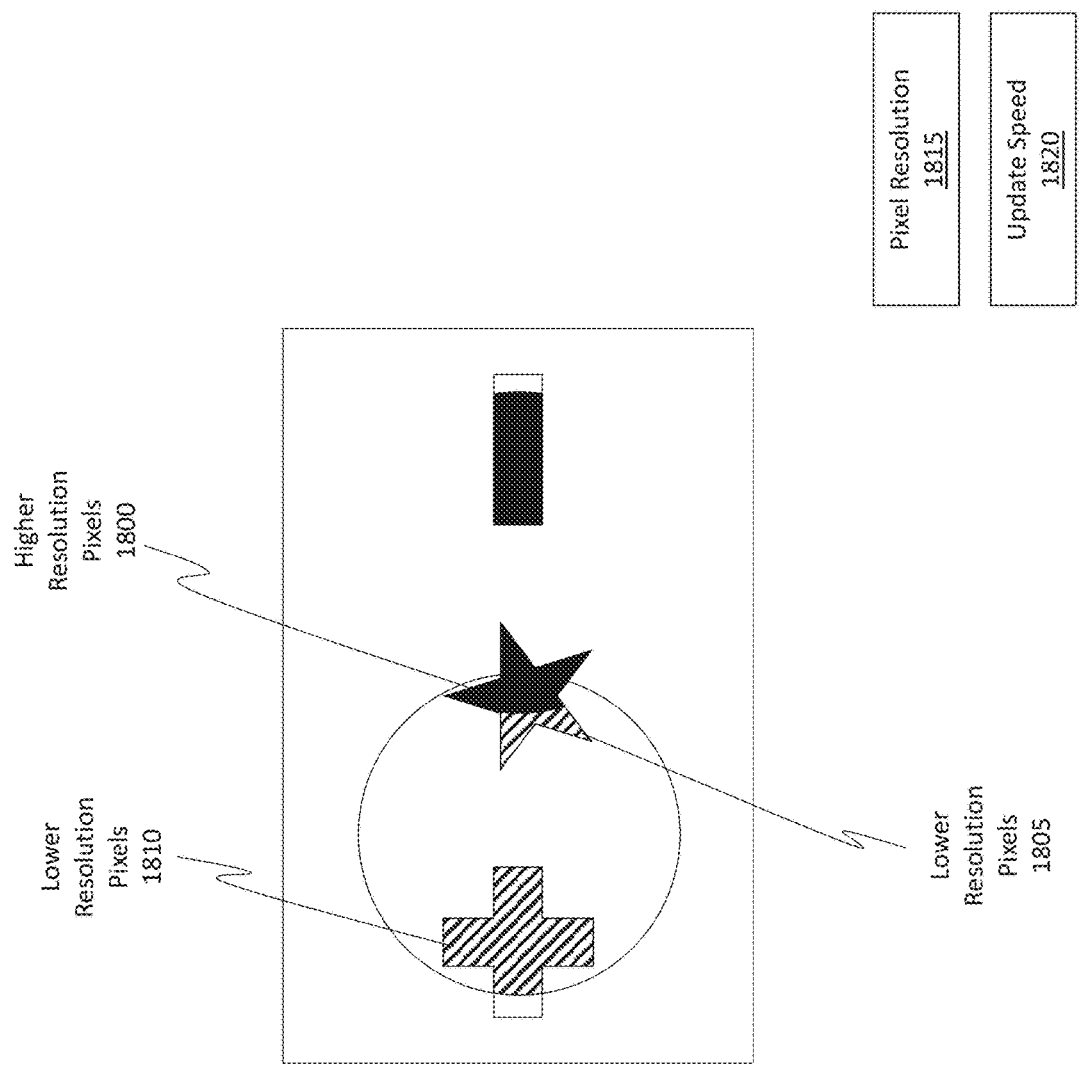
FIG. 18 illustrates how a bounding element can encompass pixels having different levels of resolution.

Recall, the pixel density and resolution of the external camera image is often higher than the pixel density and resolution of the system camera image. As a result of performing the disclosed operations, it is often the case that the bounding element will encompass pixels having different resolutions and densities. FIG. 18 shows such a scenario.

FIG. 18 shows how the bounding element (and now other portions of the overlaid image) can include or encompass higher resolution pixels 1800 (i.e. the darkened areas), which are obtained from the external camera image, and lower resolution pixels 1805 and 1810 (i.e. the diagonally-lined areas), which are obtained from the system camera image. As a result of performing the shifting operations, the embodiments in essence sacrifice pixel resolution 1815 within the bounding element for increased update speed 1820 of the bounding element (i.e. the speed by which the accurate position of the bounding element is displayed).

By way of additional clarification, the pixels that originated from the system camera image and that are bounded by the shifted bounding element (e.g., lower resolution pixels 1805 and 1810) are lower in resolution than the pixels that originated from the external camera image and that are bounded by the shifted bounding element (e.g., higher resolution pixels 1800). Stated differently, as a result of shifting the bounding element, pixels bounded by the bounding element include lower resolution pixels obtained from the system camera image and higher resolution pixels obtained from the external camera image such that shifting the bounding element sacrifices pixel resolution within the bounding element for update speed of the bounding element.

Figure 19:
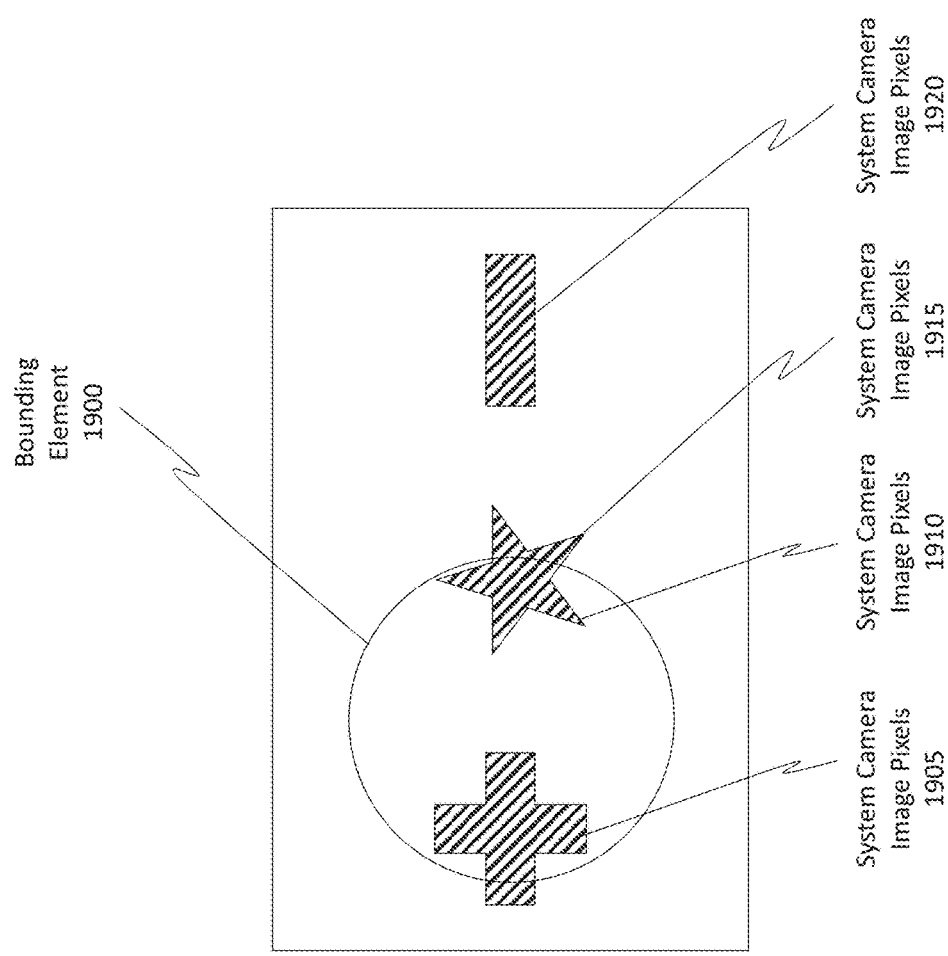
FIG. 19 illustrates how a bounding element can encompass pixels obtained only from a system camera image.

In some cases, the bounding element may not encompass any pixels obtained from the external camera image. FIG. 19 is representative.

FIG. 19 shows a bounding element 1900 and system camera image pixels 1905, 1910, 1915, and 1920. Notice, in this example, there are no pixels originating from the external camera image. It may be the case that the system camera and/or external camera have moved so much and so quickly that the shift to the bounding element 1900 results in no pixels from the external camera image being bounded by the bounding element 1900. Additionally, or alternatively, it may be the case that it is desirable to not display (at least temporarily) pixels originating from the external camera image.

By way of example, suppose the external camera is a thermal imaging camera and suppose the system camera is a visible light camera. Further suppose the system camera and the external camera are being used in a daylight environment. In such an environment, it may be beneficial to display pixels obtained only from the visible light camera image and refrain from displaying pixels obtained from the thermal imaging camera image because the user may not need enhanced thermal imaging data in that daylight environment. Instead, it may be desirable to display only the bounding element 1900 at the correct and accurate location. As such, some embodiments may selectively filter pixels or selectively refrain from displaying pixels originating from the external camera image and may instead display the bounding element 1900. Accordingly, FIG. 19 represents a scenario where pixels bounded by the shifted bounding element include pixels obtained only from the system camera image such that no pixels from the external camera image are bounded by the shifted bounding element.

Figure 20:
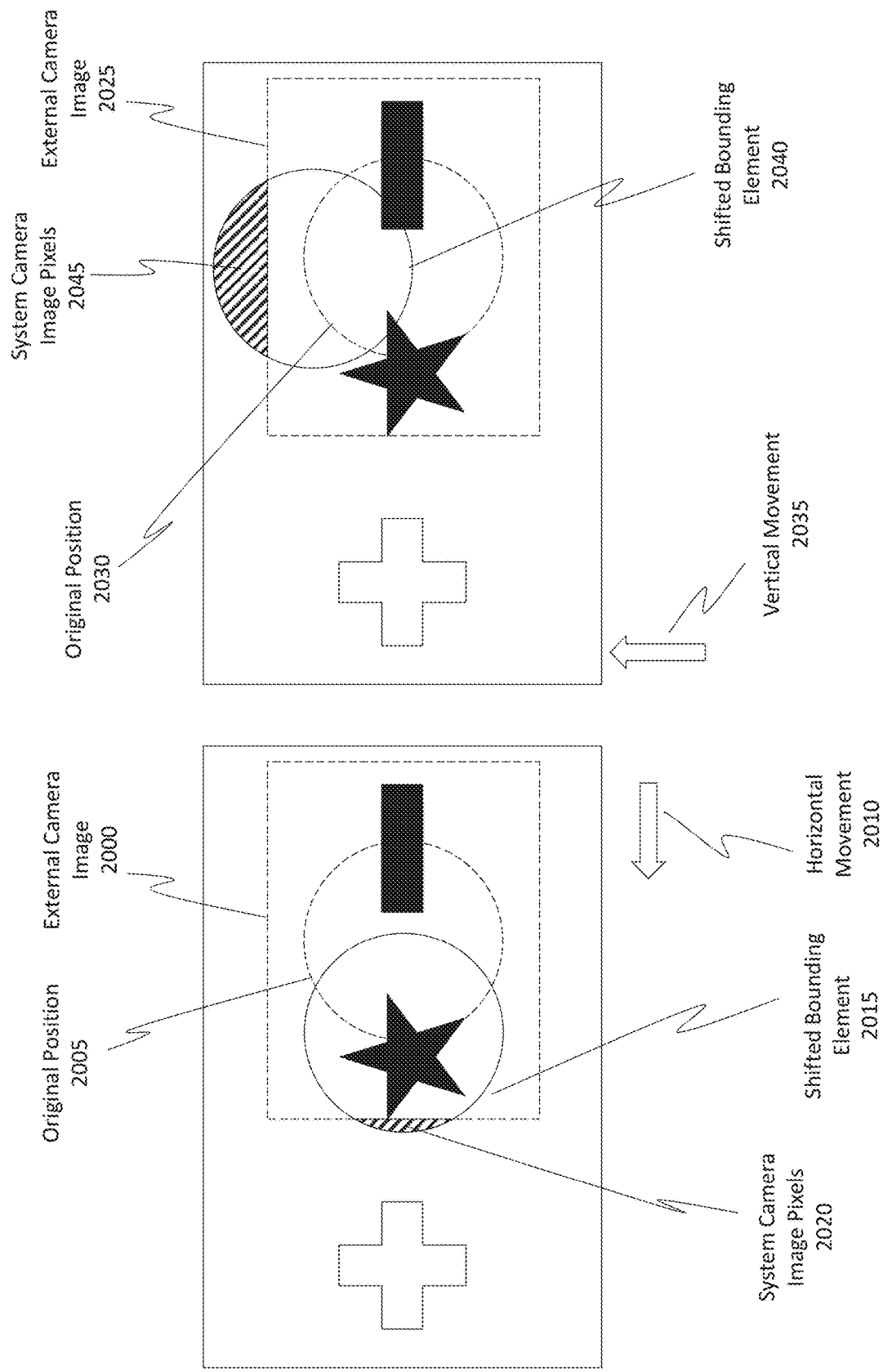
FIG. 20 illustrates the effects of different types of movement.

The direction of movement of the system camera and the external camera can also play a role in which pixels will be encompassed by the shifted bounding element. For example, it is typically the case that the image generated by the external camera is in the form of a rectangle, where the horizontal base is larger than the vertical height. Consequently, there will be differences that occur depending on which direction the system camera and/or the external camera are moving. FIG. 20 is representative.

FIG. 20 shows the rectangular external camera image 2000 and the original position 2005 of the bounding element. FIG. 20 also shows a scenario in which horizontal movement 2010 is occurring. As a result of the horizontal movement 2010, the embodiments shift the bounding element to a new position, as shown by the shifted bounding element 2015. Because of the rectangular dimension of the external camera image 2000, the bounding element can shift a larger amount and still encompass pixels originating from the external camera image 2000 as compared to a scenario where a vertical movement is occurring. To illustrate, only a small sliver of pixels, as shown by system camera image pixels 2020, will be used to fill in the area of the shifted bounding element 2015 extending beyond the external camera image 2000. In this regard, farther movements in the horizontal direction can be made before system camera image pixels begin to be bounded by the bounding element.

Now, consider the external camera image 2025, the original position 2030 of the bounding element, and the vertical movement 2035. Because the height of the rectangular external camera image 2025 is smaller than the width of the rectangle, vertical movements will likely result in more pixels originating from the system camera image being bounded by the shifted bounding element 2040. For example, a large area of pixels, as shown by system camera image pixels 2045, will be pulled in or used for this example scenario. Accordingly, a direction of movement of one or both of the system camera and the external camera (as well as a speed of that movement) will result in differences between how many system camera image pixels will be encompassed within the shifted bounding element.

Figure 21:
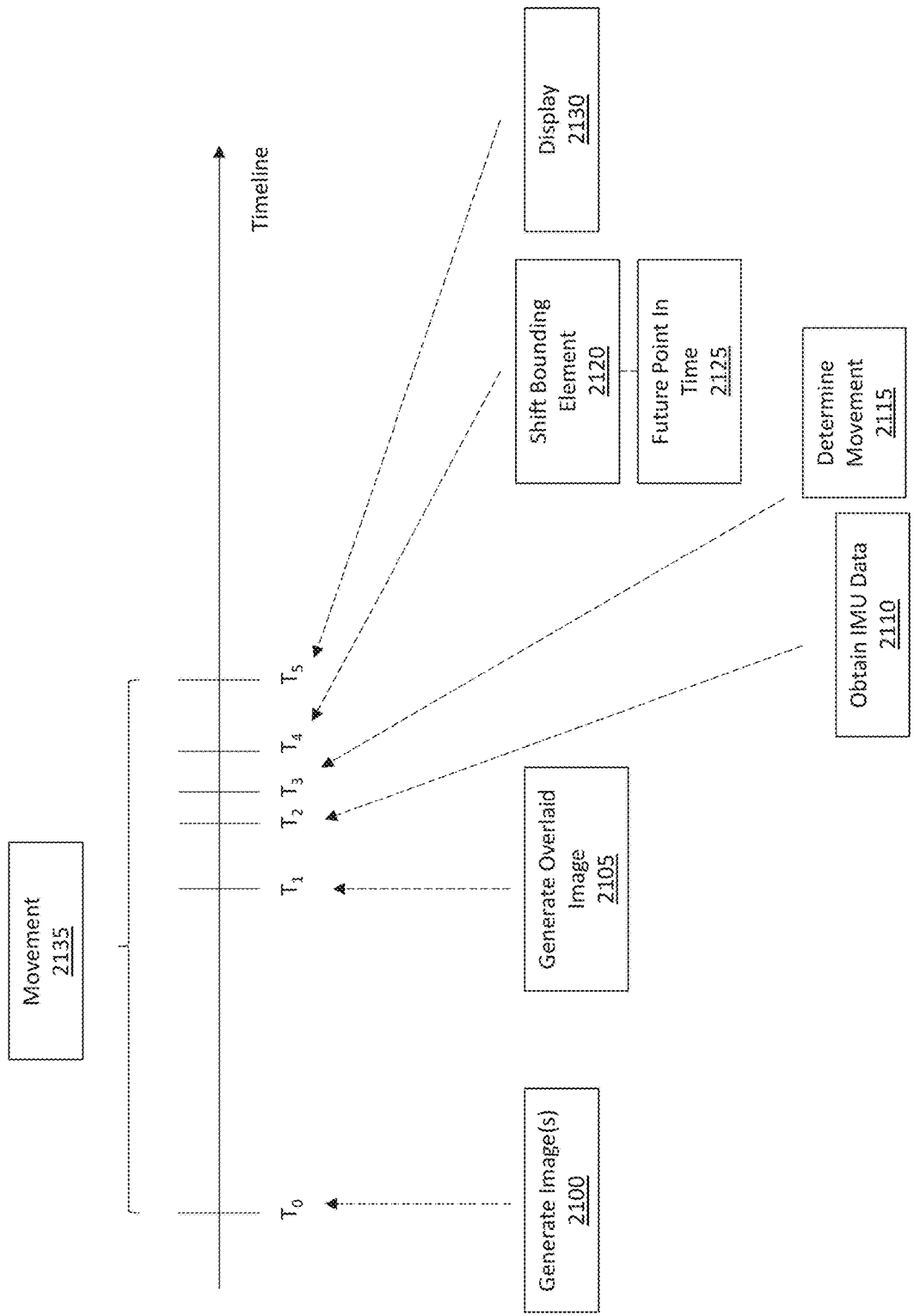
FIG. 21 illustrates an example timeline detailing some of the timing relationships between different events.

FIG. 21 illustrates an example timeline that is useful for outlining the timing of the operations. At time $T_0$, the embodiments trigger the generation of the system camera image and the external camera image, as shown by generate image(s) 2100. At time $T_1$, the embodiments generate the initial overlaid image, as shown by generate overlaid image 2105. At time $T_2$, the embodiments obtain IMU data 2110 from the IMUs associated with the system camera and the external camera. Notice, the IMU data is received or obtained after the overlaid image is generated.

At time $T_3$, the embodiments determine movement 2115 has occurred between the system camera and the external camera by analyzing the IMU data. In some cases, the time when the system camera image and the external camera image were generated (i.e. time $T_0$) to the time when the amount of movement is determined via the IMU data (i.e. time $T_3$) is at least 5 milliseconds (ms). Sometimes, the time is at least 10 ms, 15 ms, 20 ms, or more than 20 ms.

At time $T_4$, the embodiments shift the bounding element 2120 based on the IMU data. Optionally, and as will be discussed shortly, the embodiments may shift the bounding element to a future point in time 2125 that is not currently represented by the IMU data but that is a predicted location. Further details on this feature will be provided later. Pixels bounded by the shifted bounding element at time $T_4$ include pixels originating from the system camera image and pixels originating from the external camera image. Furthermore, as a time difference between time $T_0$ and time $T_4$ increases, a number of pixels originating from the system camera image increases within the shifted bounding element while a number of pixels originating from the external camera image decreases within the shifted bounding element.

At time $T_5$, the embodiments display 2130 the overlaid image with the shifted bounding element. It should be noted that at any time between time $T_0$ and $T_5$, movement 2135 of the system camera and/or the external camera may occur. It is because of this movement 2135 that the embodiments shift the bounding element in an attempt to provide an accurate illustration regarding the location of the system camera relative to the external camera.

Predictions Regarding Future Location

Figure 22:
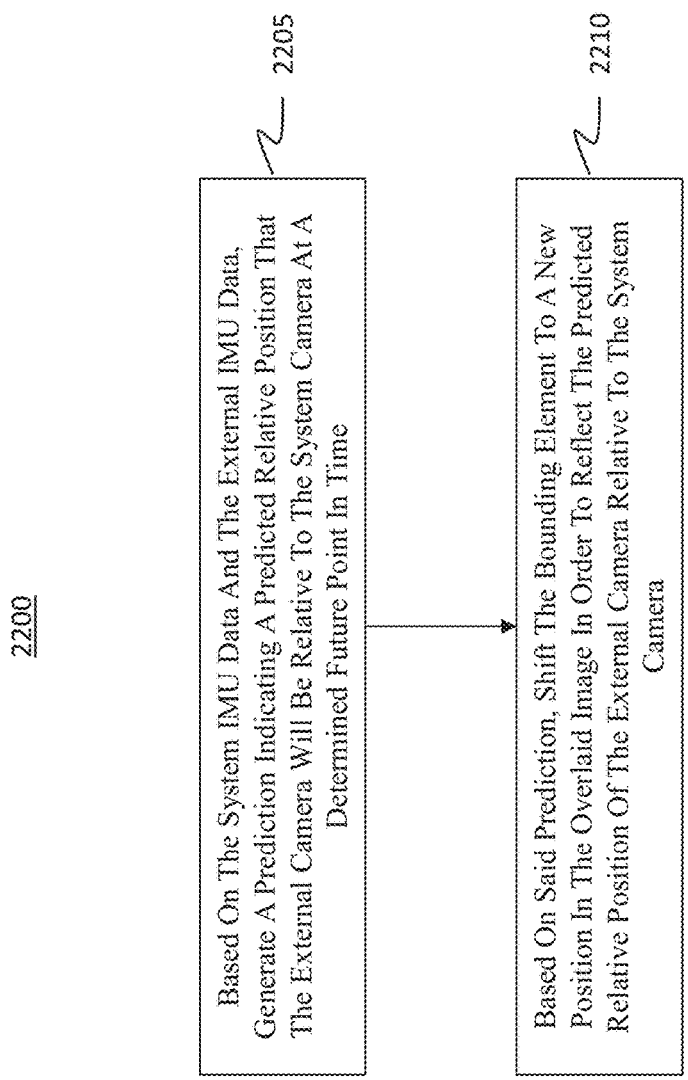
FIG. 22 illustrates a flowchart of an example method for predicting where a bounding element should be located at some future point in time.

As illustrated by the timeline of FIG. 21, it may be the case that movement occurs even after the bounding element is shifted and before the overlaid image is displayed. With such scenarios, latency may still be observable, thereby detracting the user's experience. Therefore, some embodiments generate a prediction regarding future locations of the system camera and the external camera and then shift the bounding element to reflect these predicted locations in an attempt to avoid all latency effects. FIG. 22 illustrates a flowchart of an example method 2200 for predicting where a bounding element should be located within an overlaid image using IMU data and for minimizing latency effects. It should be noted that the first few acts of method 2200 are the same as the first few acts of method 1400 in FIG. 14A. Specifically, method acts 1405, 1410, 1415, 1420, and 1425 are also included in method 2200 and thus are not repeated in FIG. 22.

Accordingly, act 2205 of method 2200 is triggered after act 1425. That is, based on the system IMU data and the external IMU data, act 2205 involves generating a prediction indicating a predicted relative position that the external camera will be relative to the system camera at a determined future point in time. This predicted point in time may be 5 milliseconds (ms) after the system camera image and the external camera image are generated (e.g., time $T_0$ in FIG. 21), 6 ms after time $T_0$, 7 ms after, 8 ms after, 9 ms after, 10 ms after, or more than 10 ms after time $T_0$. By way of example, the embodiments are able to analyze the received IMU data to predict the future locations and poses of the system camera and external camera. That prediction can then be used to determine where and how to shift the bounding element.

Specifically, based on the prediction, act 2210 includes shifting the bounding element to a new position in the overlaid image in order to reflect the predicted relative position of the external camera relative to the system camera. By generating this prediction, which reflects an estimated or predicted location of the system camera and external camera at some future point in time, the embodiments can entirely eliminate the effects of latency.

The prediction is based on the IMU data. For example, based on the IMU data, the embodiments can identify how the system camera and external camera are currently moving and can use that information to infer or predict where, when, and how the system camera and the external camera will continue to move.

Accordingly, the disclosed embodiments are able to dynamically shift a bounding element in an effort to reflect an accurate spatial relationship between a system camera and an external camera. Although pixel resolution within the bounding element may be reduced as a result of this shift, the embodiments improve the accuracy by which the bounding element is displayed. The improved pixel resolution will follow with subsequent image captures by the system camera and the external camera. As such, the reduced pixel resolution within the bounding element will be observable for only a very short period of time, which is dependent on the refresh rates of the system camera and the external camera. Once new images are generated, then the pixel resolution within the bounding element will return to its high quality state. During rapid movement events, however, accurate placement of the bounding element (e.g., the reticle) is given more weight or is assigned a higher priority over the pixel resolution (during that short period of time). Accordingly, substantial benefits may be achieved by practicing the disclosed principles.

Example Computer/Computer Systems

Figure 23:
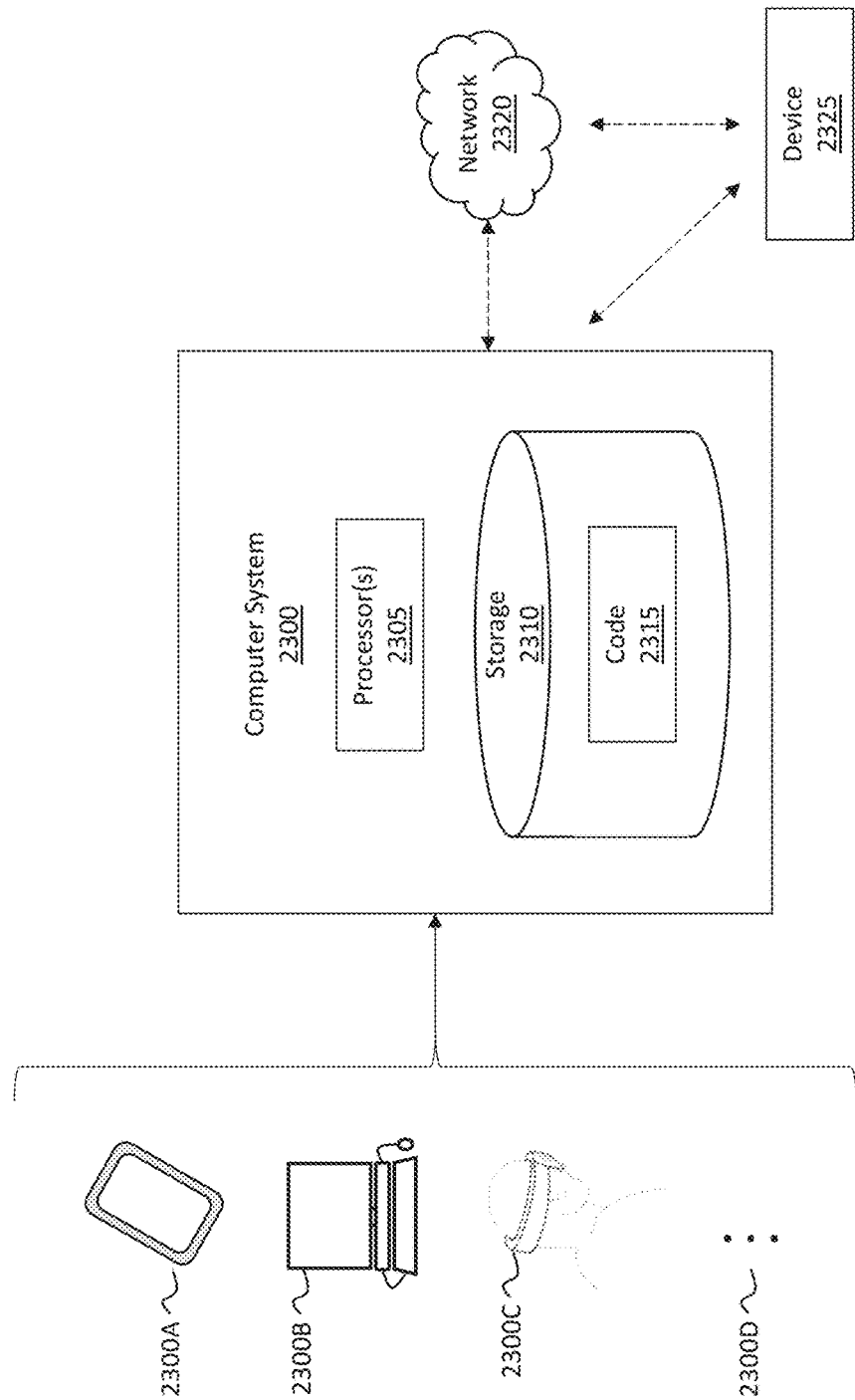
FIG. 23 illustrates an example computer system.

Attention will now be directed to FIG. 23 which illustrates an example computer system 2300 that may include and/or be used to perform any of the operations described herein. Computer system 2300 may take various different forms. For example, computer system 2300 may be embodied as a tablet 2300A, a desktop or laptop 2300B, a wearable HMD 2300C, a mobile device, or any other type of standalone device, as represented by the ellipsis 2300D. Computer system 2300 may also be a distributed system that includes one or more connected computing components/devices that are in communication with computer system 2300.

In its most basic configuration, computer system 2300 includes various different components. FIG. 23 shows that computer system 2300 includes one or more processor(s) 2305 (aka a "hardware processing unit") and storage 2310. As discussed previously, the computer system 2300 may also include any number or type of cameras.

Regarding the processor(s) 2305, it will be appreciated that the functionality described herein can be performed, at least in part, by one or more hardware logic components (e.g., the processor(s) 2305). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Storage 2310 may be physical system memory, which may be volatile, non-volatile, or some combination of the two. The term "memory" may also be used herein to refer to non-volatile mass storage such as physical storage media. If computer system 2300 is distributed, the processing, memory, and/or storage capability may be distributed as well.

Storage 2310 is shown as including executable instructions (i.e. code 2315). The executable instructions represent instructions that are executable by the processor(s) 2305 of computer system 2300 to perform the disclosed operations, such as those described in the various methods.

The disclosed embodiments may comprise or utilize a special-purpose or general-purpose computer including computer hardware, such as, for example, one or more processors (such as processor(s) 2305) and system memory (such as storage 2310), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, byway of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2300 may also be connected (via a wired or wireless connection) to external sensors (e.g., one or more remote cameras) or devices via a network 2320. For example, computer system 2300 can communicate with any number devices (e.g., device 2325, such as an external camera) or cloud services to obtain or process data. In some cases, network 2320 may itself be a cloud network. Furthermore, computer system 2300 may also be connected through one or more wired or wireless networks 2320 to remote/separate computer systems(s) that are configured to perform any of the processing described with regard to computer system 2300.

A "network," like network 2320, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2300 will include one or more communication channels that are used to communicate with the network 2320. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system that updates a position of a bounding element included in an image, said system comprising:
   at least one processor; and
   at least one hardware storage device that stores instructions that are executable by the at least one processor to cause the system to:
   access a first image of an environment, the first image being generated from a first perspective view of the environment;
   access a second image of the environment, the second image being generated from a second perspective view of the environment, wherein first content from the first camera image reflects a same portion of the environment as is reflected in second content from the second camera image;
   generate an image by overlaying the second content onto the first content, wherein the second content is surrounded by a bounding element in the image, and wherein pixels that originated from the first content and that are encompassed by the bounding element have lower resolutions than pixels that originated from the second content and that are encompassed by the bounding element; and
   shift the bounding element to a new position in the image in response to a detected event.

2. The system of claim 1, wherein the first image is generated by a first camera, and wherein the second image is generated by a second, different camera.

3. The system of claim 1, wherein the bounding element has a circular shape.

4. The system of claim 1, wherein the detected event is a movement of a camera that generated at least one of the first image or the second image.

5. The system of claim 1, wherein overlaying the second content onto the first content is performed using feature matching.

6. The system of claim 1, wherein, in addition to the bounding element, one or more additional image artifacts are included in the image.

7. The system of claim 1, wherein inertial measurement unit (IMU) data is relied on when determining how to shift the bounding element to the new position.

8. The system of claim 1, wherein inertial measurement unit (IMU) data for a camera that generated at least one of the first image or the second image is obtained, the IMU data detailing a movement of the camera, and wherein the IMU data is relied on to determine how to shift the bounding element to the new position.

9. The system of claim 1, wherein, after shifting the bounding element, the bounding element encompasses pixels that originated from both the first content and the second content.

10. The system of claim 1, wherein, prior to shifting the bounding element, the bounding element encompassed pixels that originated only from the second content.

11. A method comprising:
  accessing a first image of an environment, the first image being generated from a first perspective view of the environment;
  accessing a second image of the environment, the second image being generated from a second perspective view of the environment, wherein first content from the first camera image reflects a same portion of the environment as is reflected in second content from the second camera image;
  generating an image by overlaying the second content onto the first content, the second content being surrounded by a bounding element in the image, wherein pixels that originated from the first content and that are encompassed by the bounding element have lower resolutions than pixels that originated from the second content and that are encompassed by the bounding element; and
  shifting the bounding element to a new position in the image in response to a detected event.

12. The method of claim 11, wherein the detected event is a movement event of a camera that generated at least one of the first image or the second image.

13. The method of claim 12, wherein the movement event occurred between a time when one or both of the first image and the second image was generated and when the image was generated.

14. The method of claim 11, wherein, after the bounding element is shifted, the bounding element encompasses pixels that originated from both the first content and the second content.

15. The method of claim 11, wherein shifting the bounding element to the new position does not trigger a reprojection of image content.

16. The method of claim 11, wherein the bounding element is symmetrical in shape.

17. A method comprising:
  accessing a first image of an environment, the first image reflecting a first perspective view of the environment;
  accessing a second image of the environment, the second image reflecting a second perspective view of the environment, wherein first content from the first camera image reflects a same perspective view of the environment as is reflected in second content from the second camera image;
  generating an enhanced image by overlaying the second content onto the first content, the second content in the enhanced image being surrounded by a bounding element, wherein pixels that originated from the first content and that are encompassed by the bounding element have lower resolutions than pixels that originated from the second content and that are encompassed by the bounding element; and
  selecting a new position for the bounding element in response to a detected event.

18. The method of claim 17, wherein the detected event is a movement event of a particular unit of hardware.

19. The method of claim 18, wherein the particular unit of hardware is a camera.

* * * * *